United States Patent
Vaideeswaran et al.

(10) Patent No.: US 10,878,368 B2
(45) Date of Patent: Dec. 29, 2020

(54) CARGO LOGISTICS PLATFORM

(71) Applicant: Accenture Global Solutions Limited, Dublin (IE)

(72) Inventors: Ganesh Vaideeswaran, Chennai (IN); Vijayanambi Subramanian, Chennai (IN); Sankar Dhanushkodi, San Jose, CA (US); Mrinal Kanti Das, Chennai (IN); Arun Rajaiahmanuel, Chennai (IN); Anguraj Natarajan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/382,964

(22) Filed: Apr. 12, 2019

(65) Prior Publication Data

US 2019/0318309 A1 Oct. 17, 2019

Related U.S. Application Data

(60) Provisional application No. 62/657,461, filed on Apr. 13, 2018.

(51) Int. Cl.
*G06Q 10/08* (2012.01)
*G01C 21/34* (2006.01)
*G06Q 10/04* (2012.01)

(52) U.S. Cl.
CPC ..... *G06Q 10/08345* (2013.01); *G01C 21/343* (2013.01); *G06Q 10/047* (2013.01); *G06Q 10/0833* (2013.01); *G06Q 10/08355* (2013.01)

(58) Field of Classification Search
CPC .... G06Q 10/0833; G06Q 50/28; G06Q 10/08; G06Q 10/083; G06Q 10/0832; G06Q 10/0835; G06Q 10/08355
See application file for complete search history.

(56) References Cited

U.S. PATENT DOCUMENTS

2003/0084125 A1* 5/2003 Nagda ............... G06Q 10/08
709/219
2013/0268599 A1* 10/2013 Stollberg ............ G06Q 10/10
709/205

(Continued)

OTHER PUBLICATIONS

Null. (2018). Mobile apps transform trucking. American Trucker, , 8. Retrieved from https://dialog.proquest.com/professional/docview/2031275543?accountid=131444 (Year: 2018).*

(Continued)

*Primary Examiner* — Michael P Harrington
(74) *Attorney, Agent, or Firm* — Harrity & Harrity, LLP

(57) ABSTRACT

A device receives and stores location data and cargo transportation data. The cargo transportation data is received from a first system of a carrier and one or more other systems of partner carriers. The device receives, from the first system, a transportation availability request that is to be used to schedule transportation of cargo. The device generates and provides the first system with a recommendation that specifies recommended routes that may be used to assist in transporting the cargo. The device receives, from the first system, a booking request that identifies a selected route that vehicles are to use to transport the cargo, and provides the booking request to one or more other systems. The device receives a booking response from a second system of a partner carrier and provides the first system with an indication of whether the partner carrier has provided confirmation of assistance in transporting the cargo.

20 Claims, 12 Drawing Sheets

(56) References Cited

U.S. PATENT DOCUMENTS

| | | | |
|---|---|---|---|
| 2016/0162838 A1* | 6/2016 | Torkian | G06Q 10/107 |
| | | | 709/206 |
| 2018/0025417 A1* | 1/2018 | Brathwaite | G06Q 30/08 |
| | | | 705/14.66 |
| 2018/0232693 A1* | 8/2018 | Gillen | G06F 16/288 |
| 2018/0349849 A1* | 12/2018 | Jones | G06N 20/00 |

OTHER PUBLICATIONS

Lindsey, C. L. (2014). Third party logistics in the transportation spot market: Using analytics to improve operations (3638235). Available from ProQuest Dissertations and Theses Professional. (1618204922) (Year: 2014).*

* cited by examiner

400

405 Receive global reference data that includes location data for sites that are used as stops while transporting particular cargo

410 Receive cargo transportation data from systems associated with a carrier and a set of partner carriers, wherein the cargo transportation data includes two or more of: route data for a set of routes that vehicles are capable of using to transport the particular cargo between the sites, capacity data that identifies amounts of available capacity within the vehicles, partnership data that identifies one or more types of partnerships between the carrier and respective partner carriers of the set of partner carriers, or price data that specifies rates for using the vehicles to transport the particular cargo between two or more of the sites, and wherein a first format used to communicate with a first system associated with the carrier is different from one or more other formats used to communicate with other systems associated with the set of partner carriers

415 Store the global reference data and the cargo transportation data using a data structure

420 Receive, from the first system associated with the carrier, a transportation availability request that is to be used to schedule transportation of cargo between a first site and a second site, wherein the transportation availability request includes: a carrier identifier for the carrier, site data that identifies geographic locations of the first site and the second site, and particular capacity data that specifies an amount of capacity needed to transport the cargo

| Generate a recommendation that specifies one or more recommended routes, of the set of routes, that particular vehicles, of the vehicles, are capable of traversing in order to assist in transporting the cargo between the first site and the second site, wherein the recommendation is based on the global reference data, the cargo transportation data, and contents of the transportation availability request | 425 |

↓

| Provide the recommendation to the first system | 430 |

↓

| Receive, from the first system, a booking request that includes route selection data that identifies a selected route, of the one or more recommended routes, that one or more vehicles, of the particular vehicles, are to use to transport the cargo | 435 |

↓

| Provide the booking request to one or more other systems associated with one or more partner carriers of the set of partner carriers | 440 |

↓

| Receive one or more booking responses from the one or more other systems | 445 |

↓

| Provide, to the first system, an indication of whether the one or more partner carriers have provided confirmation of assistance in transporting the cargo between the first site and the second site. | 450 |

- 535 — Generate a recommendation that specifies one or more recommended routes, of the set of routes, that particular vehicles, of the vehicles, are capable of traversing in order to assist in transporting the cargo between the first site and the second site, wherein the recommendation is based on the global reference data, contents of the transportation availability request, and a subset of the cargo transportation data that excludes particular cargo transportation data that fails to comply with the set of data sharing restrictions

- 540 — Provide the recommendation to the first system

- 545 — Receive, from the first system, a booking request that includes route selection data that identifies a selected route, of the one or more recommended routes, that one or more vehicles, of the particular vehicles, are to use to transport the cargo

- 550 — Provide the booking request to one or more other systems associated with one or more partner carriers of the set of partner carriers

- 555 — Receive one or more booking responses from the one or more other systems

- 560 — Provide, to the first system, an indication of whether the one or more partner carriers have provided confirmation of assistance in transporting the cargo between the first site and the second site.

| Generate a recommendation that specifies one or more recommended routes, of the set of routes, that particular vehicles, of the vehicles, are capable of traversing in order to assist in transporting the cargo between the first site and the second site, wherein the recommendation is based on the global reference data, the cargo transportation data, contents of the transportation availability request, and the capacity data | — 630 |

↓

| Provide the recommendation to the first system | — 635 |

↓

| Receive, from the first system, a booking request that includes route selection data that identifies a selected route, of the one or more recommended routes, that one or more vehicles, of the particular vehicles, are to use to transport the cargo | — 640 |

↓

| Provide the booking request to one or more other systems associated with one or more partner carriers of the set of partner carriers | — 645 |

↓

| Receive one or more booking responses from the one or more other systems | — 650 |

↓

| Provide, to the first system, an indication of whether the one or more partner carriers have provided confirmation of assistance in transporting the cargo between the first site and the second site. | — 655 |

FIG. 6B

CARGO LOGISTICS PLATFORM

RELATED APPLICATION

This application claims priority under 35 U.S.C. § 119 to U.S. Provisional Patent Application No. 62/657,461, filed on Apr. 13, 2018, the content of which is incorporated by reference herein in its entirety.

BACKGROUND

Freight logistics is the physical process of transporting cargo (e.g., a good, a service, and/or the like). For example, one or more vehicles may be assigned a route that may be traversed to delivery cargo to a destination location.

SUMMARY

According to some implementations, a method may include receiving, by a device, global reference data that includes location data for sites that are used as stops while transporting particular cargo. The method may include receiving, by the device, cargo transportation data from systems associated with a carrier and a set of partner carriers, wherein the cargo transportation data includes two or more of: route data for a set of routes that vehicles are capable of using to transport the particular cargo between the sites, capacity data that identifies amounts of available capacity within the vehicles, partnership data that identifies one or more types of partnerships between the carrier and respective partner carriers of the set of partner carriers, or price data that specifies rates for using the vehicles to transport the particular cargo between two or more of the sites, and wherein a first format used to communicate with a first system associated with the carrier is different from one or more other formats used to communicate with other systems associated with the set of partner carriers. The method may include storing, by the device, the global reference data and the cargo transportation data using a data structure. The method may include receiving, by the device and from the first system associated with the carrier, a transportation availability request that is to be used to schedule transportation of cargo between a first site and a second site, wherein the transportation availability request includes: a carrier identifier for the carrier, site data that identifies geographic locations of the first site and the second site, and particular capacity data that specifies an amount of capacity needed to transport the cargo. The method may include generating, by the device, a recommendation that specifies one or more recommended routes, of the set of routes, that particular vehicles, of the vehicles, are capable of traversing in order to assist in transporting the cargo between the first site and the second site, wherein the recommendation is based on the global reference data, the cargo transportation data, and contents of the transportation availability request. The method may include providing, by the device, the recommendation to the first system. The method may include receiving, by the device and from the first system, a booking request that includes route selection data that identifies a selected route, of the one or more recommended routes, that one or more vehicles, of the particular vehicles, are to use to transport the cargo; providing, by the device, the booking request to one or more other systems associated with one or more partner carriers of the set of partner carriers. The method may include receiving, by the device, one or more booking responses from the one or more other systems. The method may include providing, by the device and to the first system, an indication of whether the one or more partner carriers have provided confirmation of assistance in transporting the cargo between the first site and the second site.

According to some implementations, a device may include one or more memories; and one or more processors, operatively coupled to the one or more memories, to receive global reference data that includes location data for sites that are used as stops while transporting particular cargo. The one or more processors may receive cargo transportation data from systems associated with a carrier and a set of partner carriers, wherein the cargo transportation data includes: route data for a set of routes that vehicles are capable of using to transport the particular cargo between the sites, capacity data that identifies amounts of available capacity within the vehicles, and partnership data that identifies one or more types of partnerships between the carrier and respective partner carriers of the set of partner carriers, and wherein a first format used to communicate with a first system associated with the carrier is different from one or more other formats used to communicate with other systems associated with the set of partner carriers. The one or more processors may store the global reference data and the cargo transportation data using a data structure. The one or more processors may receive, from the first system associated with the carrier, a transportation availability request that is to be used to schedule transportation of cargo between a first site and a second site, wherein the transportation availability request includes: a carrier identifier for the carrier, site data that identifies geographic locations of the first site and the second site, and particular capacity data that specifies an amount of capacity needed to transport the cargo. The one or more processors may identify the one or more types of partnerships between the carrier and the respective partner carriers by using the carrier identifier to reference the data structure. The one or more processors may identify a set of data sharing restrictions based on the one or more types of partnerships that have been identified. The one or more processors may generate a recommendation that specifies one or more recommended routes, of the set of routes, that particular vehicles, of the vehicles, are capable of traversing in order to assist in transporting the cargo between the first site and the second site, wherein the recommendation is based on the global reference data, contents of the transportation availability request, and a subset of the cargo transportation data that excludes particular cargo transportation data that fails to comply with the set of data sharing restrictions. The one or more processors may provide the recommendation to the first system. The one or more processors may receive, from the first system, a booking request that includes route selection data that identifies a selected route, of the one or more recommended routes, that one or more vehicles, of the particular vehicles, are to use to transport the cargo. The one or more processors may provide the booking request to one or more other systems associated with one or more partner carriers of the set of partner carriers. The one or more processors may receive one or more booking responses from the one or more other systems. The one or more processors may provide, to the first system, an indication of whether the one or more partner carriers have provided confirmation of assistance in transporting the cargo between the first site and the second site.

According to some implementations, a non-transitory computer-readable medium may store one or more instructions. The one or more instructions, when executed by one or more processors of a device, may cause the one or more processors to receive global reference data for sites that are used as stops while transporting particular cargo. The one or more instructions may cause the one or more processors to receive cargo transportation data from systems associated with a carrier and a set of partner carriers, wherein the cargo transportation data includes at least one of: route data for a set of routes that vehicles are capable of using to transport the particular cargo between the sites, partnership data that identifies one or more types of partnerships between the carrier and respective partner carriers of the set of partner carriers, or price data that specifies rates for using the vehicles to transport the particular cargo between two or more of the sites. The one or more instructions may cause the one or more processors to store the global reference data and the cargo transportation data using a data structure. The one or more instructions may cause the one or more processors to receive, from a first system associated with the carrier, a transportation availability request that is to be used to schedule transportation of cargo between a first site and a second site, wherein the transportation availability request includes: site data that identifies geographic locations of the first site and the second site, and particular capacity data that specifies an amount of capacity needed to transport the cargo. The one or more instructions may cause the one or more processors to obtain, by interacting with a subset of the other systems associated with the set of partner carriers, capacity data that identifies amounts of available capacity within the vehicles. The one or more instructions may cause the one or more processors to generate a recommendation that specifies one or more recommended routes, of the set of routes, that particular vehicles, of vehicles, are capable of traversing in order to assist in transporting the cargo between the first site and the second site, wherein the recommendation is based on the global reference data, the cargo transportation data, contents of the transportation availability request, and the capacity data. The one or more instructions may cause the one or more processors to provide the recommendation to the first system. The one or more instructions may cause the one or more processors to receive, from the first system, a booking request that includes route selection data that identifies a selected route, of the one or more recommended routes, that one or more vehicles, of the particular vehicles, are to use to transport the cargo. The one or more instructions may cause the one or more processors to provide the booking request to one or more other systems associated with one or more partner carriers of the set of partner carriers. The one or more instructions may cause the one or more processors to receive one or more booking responses from the one or more other systems. The one or more instructions may cause the one or more processors to provide, to the first system, an indication of whether the one or more partner carriers have provided confirmation of assistance in transporting the cargo between the first site and the second site.

BRIEF DESCRIPTION OF THE DRAWINGS

FIGS. 4A and 4B, 5A and 5B, and 6A and 6B are flowcharts of example processes for assisting a carrier in scheduling transportation of cargo between a first site and a second site, where one or more vehicles associated with one or more partner carriers are to assist with transportation of the cargo.

DETAILED DESCRIPTION

Figure 1A:
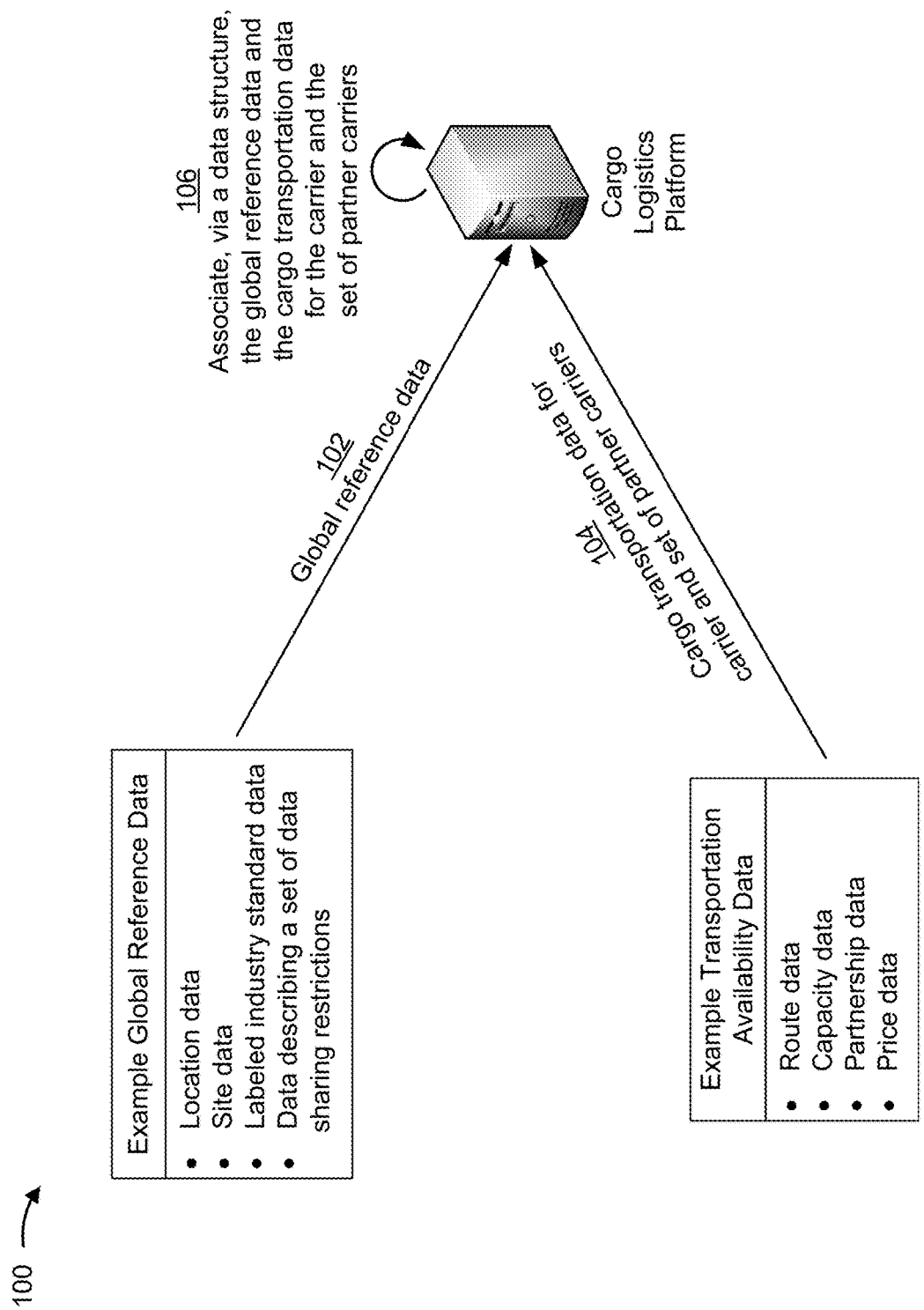
FIGS. 1A-1D are diagrams of one or more example implementations described herein.

The following detailed description of example implementations refers to the accompanying drawings. The same reference numbers in different drawings may identify the same or similar elements.

Vehicles may be used to transport cargo via air, via land, via sea, and/or the like. For example, an aerial vehicle may be used to transport cargo to various destinations across the world. In this case, a carrier (e.g., an airline) and one or more partner carriers (e.g., one or more partner airlines) may interact with each other to schedule and manage transportation of the cargo.

However, the carrier may be unable to efficiently and effectively schedule and management transportation of the cargo. For example, the carrier may be unable to effectively schedule and manage transportation of cargo because of lack of visibility into booking systems of partner carriers (e.g., which may contain important routing data for vehicles, available capacity data for the vehicles, and/or the like), because of different technology platforms and/or technology infrastructure utilized by the booking systems of the partner carriers (e.g., which may utilize databases that are incompatible with each other, legacy systems that are difficult to integrate into newer systems, and/or the like), because of restrictions imposed on cargo transportation agreements (e.g., which may be based on a type of partnership between the carrier and a particular partner carrier), and/or the like.

Some implementations described herein provide a cargo logistics platform to coordinate collaboration between a carrier and a set of partner carriers to assist the carrier in coordinating with one or more partner carriers to transport cargo between a first site and a second site. For example, the cargo logistics platform may be configured with location data for a set of sites that are capable of being used as stops in cargo delivery routes (referred to herein as routes). In this case, the cargo logistics platform may onboard the carrier and the set of partner carriers such that the cargo logistics platform is able to access to cargo transportation data for the carrier and the set of partner carriers. The cargo transportation data may include route data, capacity data, partnership data, price data, and/or the like, each as defined further herein.

Additionally, the cargo logistics platform may receive, from a first booking system associated with the carrier, a transportation availability request that may be used to assist the carrier in scheduling transportation of the cargo. This may allow the cargo logistics platform to generate, based on the location data, the cargo transportation data, and contents of the transportation availability request, a recommendation that specifies one or more recommended routes that particular vehicles are capable of traversing in order to transport the cargo between the first site and the second site, wherein the particular vehicles are controlled by one or more of the set of partner carriers.

Furthermore, the cargo logistics platform may receive a booking request from the first booking system. The booking request may include route selection data that identifies a selected route, of the one or more recommended routes, that one or more vehicles, of the particular vehicles, are to use to transport the cargo. In this case, the cargo logistics platform may provide the booking request to one or more other booking systems associated with one or more partner carriers that control the one or more vehicles that are to be used to transport the cargo via the selected route. This may cause the one or more other booking systems to provide the cargo logistics platform with one or more booking responses, which the cargo logistics platform may use to provide the first booking system with an indication of whether the one or more partner carriers have provided confirmation of assistance in transporting the cargo.

In this way, the cargo logistics platform efficiently and effectively assists the carrier in scheduling transportation of the cargo. For example, by onboarding the carrier and the set of partner carriers to the cargo booking application (e.g., which gives the cargo logistics platform access to the transportation booking data), the cargo logistics platform is able to make intelligent routing and scheduling decisions. This conserves resources (e.g., processing resources, network resources, memory resources, and/or the like) of the first booking system of the carrier and the set of booking systems of the partner carriers by eliminating needless back-and-forth communications that may be required of inferior platforms or solutions.

Additionally, by supporting communication between booking systems that use different technology infrastructures that handle data in different formats, the cargo logistics platform conserves resources of devices of the carrier and the set of partner carriers by eliminating a need to replace existing booking systems, by eliminating a need to modify technology infrastructures supporting the existing booking systems, and/or the like. Furthermore, by identifying and recommending optimal routes, the cargo logistics platform improves a likelihood that the cargo will be transported to a destination in a time efficient, cost effective manner (e.g., relative to an inferior solution that identifies a less efficient and/or effective route).

FIGS. 1A-1D are diagrams of an example implementation 100 described herein. For example, example implementation(s) 100 may include a cargo logistics platform, a first booking system (shown as Booking System 1), and a set of booking systems (which include, as shown, Booking System 2). The first booking system is associated with a carrier, and the set of booking systems are associated with a set of partner carriers. As shown in FIG. 1A-1D, the cargo logistics platform may assist the carrier with booking transportation of cargo from a first site to a second site in a manner that utilizes one or more vehicles associated with a set of partner carriers.

A site may be any facility (e.g., an airport, a warehouse, and/or the like), drop-off point, and/or the like, that may be part of a route of a vehicle that is transporting cargo. For example, a set of sites may be used as stops in a route, and may include an origin site (e.g., the origin site may be said to be an initial stop in the route), one or more intermediary sites, and/or a destination site. The carrier and/or the set of partner carriers may be organizations that control vehicles that are used to deliver cargo, individuals, and/or the like. For example, a carrier and/or a partner carrier may be an airline, a freight company, and/or the like. As used herein, a carrier and/or a partner carrier may "control" a vehicle by having legal ownership of the vehicle, by having physical possession of the vehicle, by having permission to use the vehicle via a contract, and/or the like. A vehicle may be an aircraft, a land craft (e.g., a car, a truck, and/or the like), a watercraft (e.g., a ship, a boat, and/or the like), and/or the like. Some implementations described herein allow the cargo logistics platform to assist the carrier with scheduling transportation of cargo using vehicles controlled by one or more partner carriers. It is to be understood that this is provided by way of example, and that in other implementations, the cargo logistics platform may assist the carrier in scheduling transportation of cargo in a manner that utilizes vehicles of one or more non-partnered carriers.

As shown in FIG. 1A, and by reference number 102, the cargo logistics platform may receive global reference data. For example, the cargo logistics platform may receive, from one or more data storage devices, global reference data that may be used to perform one or more functions of a cargo booking application, as described further herein.

The global reference data may include location data that identifies geographic locations of a set of sites that are used as stops while transporting cargo, site data for the set of sites (e.g., a site identifier for a site, time data indicating a number of hours a site is open, and/or the like), labeled industry standard data for particular types of data and/or particular types of cargo that have become standard throughout a transportation industry (e.g., a UN (United Nations) number, an NA (North America) number, a type of unit load device (ULD), and/or the like), data describing a set of data sharing restrictions, and/or the like. The set of data sharing restrictions may be based on one or more types of partnerships between the carrier and each respective partner carrier. The set of data sharing restrictions may include a first restriction that prevents the carrier and a partner carrier from sharing particular price data, a second restriction that prevents the carrier and a partner carrier from sharing particular types of data, a third restriction that limits the first restriction and/or the second restriction to a particular geographic area, and/or the like.

In some implementations, the cargo logistics platform may be configured with an exchange connection component that allows the cargo logistics platform to interact with a booking system of the carrier and/or a set of booking systems of the set of partner carriers. The exchange connection component may support different types of application programming interfaces (APIs) and/or protocols between the cargo logistics platform and particular booking systems (e.g., a simple object access protocol (SOAP) API, a representational state transfer (REST) API, a secure hypertext transfer protocol (HTTPS), and/or the like), may support different types of payloads (e.g., an extensible markup language (XML) payload, a JavaScript Object Notation (JSON) payload, and/or the like), may support receipt and/or transmission of messages that have different types of nomenclature (e.g., an acronym for a term used within a first booking system may be different than a corresponding acronym for the same term as used within a second booking system), may support conversions between data types used in one or more booking systems and a standardized data type used by the cargo logistics platform, and/or the like.

As shown by reference number 104 the cargo logistics platform may receive cargo transportation data for the carrier and the set of partner carriers. For example, the cargo logistics platform may receive cargo transportation data for the carrier and for each partner carrier during an onboarding procedure, as described further below.

The cargo transportation data may include route data, capacity data, partnership data, price data, and/or the like. The route data may include available route data and/or scheduled route data. The available route data may describe a set of permissible routes that vehicles are capable of traversing in order to transport cargo. The scheduled route data may describe a set of scheduled routes that are assigned to particular vehicles. The capacity data may identify amounts of available capacity within particular vehicles. For example, the capacity data may identify an amount of available weight, an available volume, and/or the like.

The partnership data may identify one or more types of partnerships between the carrier and each respective partner carrier. The one or more types of partnerships may include an interline partnership, a block-specific partnership, a joint venture (JV) partnership (e.g., for topic sharing, for cost sharing, and/or the like), a codeshare partnership, and/or the like. The partnership data for a partnership between the carrier and a partner carrier may include a partnership identifier, particular data that describes one or more data sharing restrictions that are applicable to the partnership, and/or the like. The price data may include specific rates that may be charged for using a vehicle to transport cargo, permissible ranges of rates that may be referenced when offering a particular price for using a vehicle to transport cargo, and/or the like.

In some implementations, the carrier and a partner carrier may have a partnership that dictates whether any data sharing restrictions will apply to any collaboration between the carrier and the partner carrier. Additionally, or alternatively, the carrier and the partner carrier may have multiple partnerships that dictate whether any data sharing restrictions will apply. For example, the carrier and the partner carrier may have a first partnership and a second partnership that are in effect in particular geographic regions (e.g., a data sharing restriction associated with a first type of partnership may be active while a vehicle is being transported in a first geographic region and a second data sharing restriction associated with a second type of partnership may be active while the vehicle is being transported within a second geographic region).

In some implementations, the cargo logistics platform may receive the cargo transportation data based on onboarding the carrier and/or the set of partner carriers. For example, the cargo logistics platform may onboard the carrier by performing a setup procedure and a testing procedure. The setup procedure may cause cargo transportation data for the carrier to be provided to and/or made accessible to the cargo logistics platform. Additionally, the cargo logistics platform may, as part of the setup procedure, associate the cargo transportation data with the global reference data (as further described below). In some implementations, the setup procedure may include establishing simulated cargo transportation data for a simulated partner carrier. The testing procedure may include, for example, using the simulated cargo transportation data to process a request from the first booking system and to determine whether the testing procedure was completed successfully. The setup and testing procedure may also be performed for the set of partner carriers.

In addition to, or as an alternative to testing with a simulated partner carrier, the cargo logistics platform may perform another test procedure to verify one or more communications between the first booking system of the carrier and a second booking system of a partner carrier that has already been onboarded. For example, the cargo logistics platform may perform a user acceptance test (UAT), a system integration test (SIT), and/or the like, to determine whether a threshold level of quality is satisfied. In some implementations, the cargo logistics platform may deploy an environment (e.g., a local environment dedicated to the carrier) based on determining that the threshold level of quality is satisfied.

As shown by reference number 106, the cargo logistics platform may associate, via a data structure, the global reference data and the cargo transportation data for the carrier and the set partner carriers. For example, the cargo transportation data may be in a number of different formats and the cargo logistics platform may associate the cargo transportation data with standardized identifiers that are in a uniform format. In some implementations, the cargo logistics platform may associate the cargo transportation data with and/or the standardized identifiers with a carrier identifier for the carrier and/or a set of partner carrier identifiers for the set of partner carriers.

In some implementations, the cargo logistics platform may be configured with a set of route optimization techniques that may be used to recommend routes to the carrier. For example, the cargo logistics platform may be configured with a shortest path technique, a least cost path technique, a route ranking technique (e.g., a heuristic technique, a technique that ranks routes based on capacity data and/or price data, and/or the like), and/or the like. Additional information regarding the set of route optimization techniques is provided further herein.

Additionally, or alternatively, the cargo logistics platform may train a data model to identify recommended routes. For example, the cargo logistics platform may perform one or more feature detection techniques to identify a set of features that may be used to train a data model and may use one or more machine learning techniques to train the data model to generate route scores for a set of available routes and/or cost scores associated with the set of available routes. The cargo logistics platform may then identify recommended routes based on the route scores and/or the cost scores.

The one or more feature detection techniques may include using a technique that involves text mining and latent semantic analysis (LSA), a trend variable analysis technique, an interest diversity analysis technique, a technique using a neural network, a composite indicators analysis technique, a clustering technique, and/or the like. The one or more machine learning techniques may include a classification technique, a regression technique, a clustering technique, a neural network, and/or the like.

The set of features may include data that impacts whether a given route is a best-fit route for transportation of particular cargo. A given route may be a best-fit route for a carrier based on cost, total number of stops to reach a destination site, estimated delivery time, and/or the like. The set of features may be location data values, particular types of transportation availability data values (e.g., available route data values, available capacity data values, partnership data values, price data values, and/or the like), values that identify trends found within the transportation availability data, and/or the like.

In this way, the cargo logistics platform associates global reference data and cargo transportation data in a manner that may be used to service one or more types of requests, as described further herein.

Figure 1B:
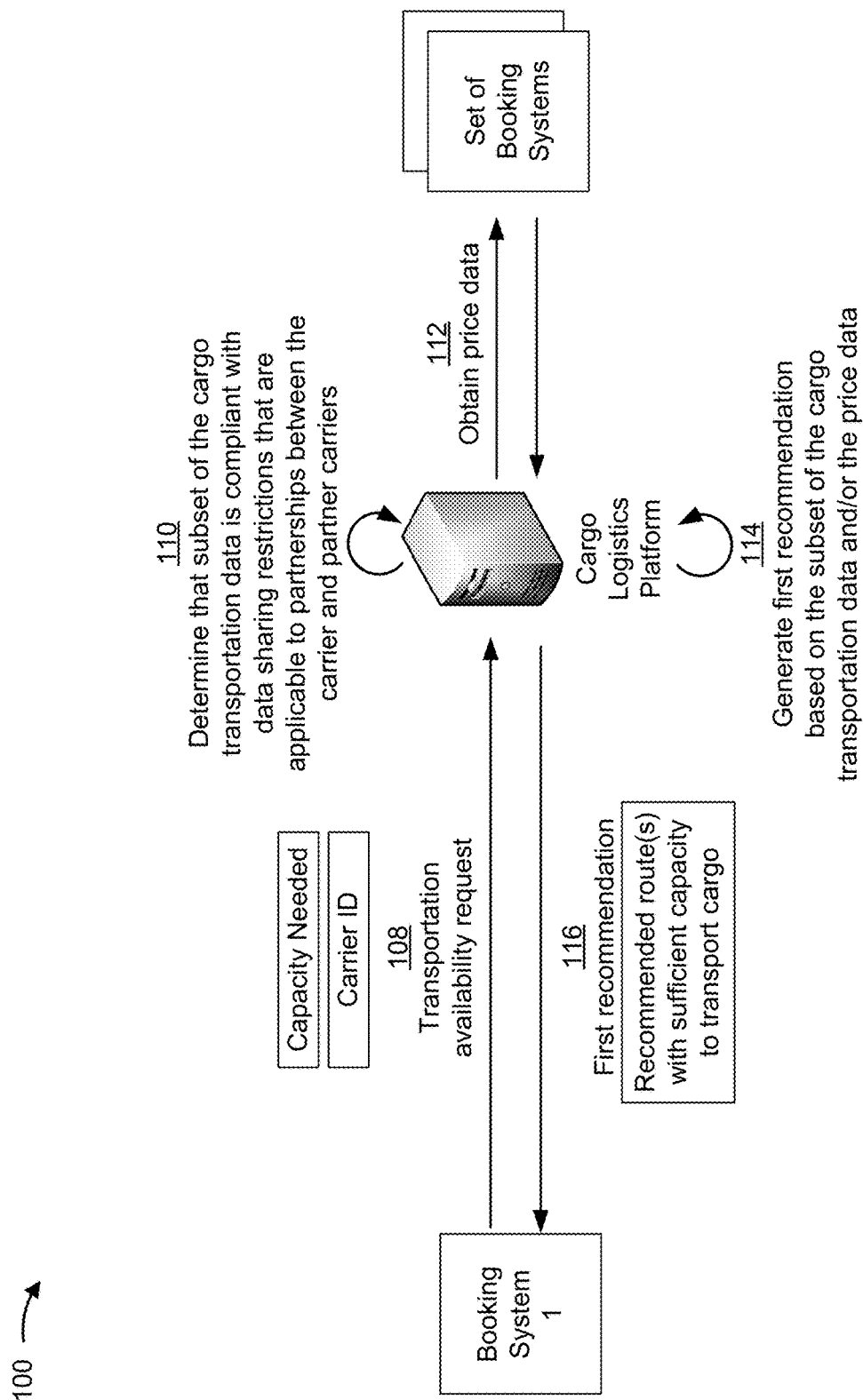

As shown in FIG. 1B, and by reference number 108, the cargo logistics platform may receive a transportation availability request from the first booking system of the carrier. The transportation availability request may include a request type identifier (e.g., that indicates that the request is a transportation availability request), a carrier identifier for the carrier, capacity data that specifies an amount of capacity needed to transport the cargo, a route availability request, a capacity availability request, and/or the like. The route availability request may be made to identify a set of candidate routes that may be used to transport cargo between a first site and a second site. The capacity availability request may be made to identify amounts of available capacity in vehicles that are capable of using the set of candidate routes to transport the cargo.

As shown by reference number 110, the cargo logistics platform may determine that a subset of the cargo transportation data is compliant with data sharing restrictions that are applicable to partnerships between the carrier and the set of partner carriers. For example, the cargo logistics platform may obtain the cargo transportation data for each respective partner carrier and may process the cargo transportation data (in a manner described further herein) to determine that a subset of the cargo transportation data is compliant with the identified types of partnerships.

In some implementations, the cargo logistics platform may obtain the cargo transportation data from the data structure. For example, the cargo logistics platform may use the carrier identifier included in the transportation availability request to reference the data structure to obtain the cargo transportation data for the set of partner carriers.

Additionally, or alternatively, the cargo logistics platform may obtain the cargo transportation data from the set of booking systems of the set of partner carriers. For example, the cargo logistics platform may convert the transportation availability request to one or more formats that are compatible with each respective booking system. In this case, the cargo logistics platform may provide converted transportation availability requests to each respective booking system, which may cause each respective booking system to provide the cargo logistics platform with the cargo transportation data.

In some implementations, the cargo logistics platform may determine that particular cargo transportation data, that is associated with a partner carrier, is compliant with one or more data sharing restrictions that are applicable to a partnership between the carrier and the partner carrier. For example, the cargo logistics platform may be configured with a set of rules that indicate which types of data, of the cargo transportation data, are compliant with the one or more data sharing restrictions. This may allow the cargo logistics platform to reference the set of rules to determine that the particular cargo transportation data is compliant with the one or more data sharing restrictions.

As an example, the carrier and a first partner carrier may have a JV partnership, and the carrier and a first partner carrier may have an interline partnership. In this example, the cargo logistics platform may determine that particular price data, that describes profit sharing between the carrier and the first partner carrier, is compliant with a data sharing restriction relating to sharing profits (e.g., because the carrier and the first partner carrier are in a JV partnership that is permitted to engage in profit sharing (which may include sharing price data)). Additionally, the cargo logistics platform may determine that particular capacity data, that describes an amount of available capacity in vehicles of the second partner carrier, is not compliant with a data sharing restriction relating to sharing capacity data (e.g., because the carrier and the second partner carrier are in an interline partnership that is prohibited from sharing capacity data based on one or more anti-trust laws of a given jurisdiction).

In some implementations, a type of partnership between the carrier and a partner carrier may be based on geographic location. For example, the carrier and a partner carrier may have a first type of partnership that is applicable to vehicles transporting cargo within a first geographic region and may have a second type of partnership that is applicable to vehicles transporting cargo within a second geographic region. In this case, the cargo logistics platform may identify geographic coordinates that define a set of candidate routes that are capable of being used to transport the cargo between the first site and the second site and may determine whether at least a portion of the geographic coordinates are within the first geographic region and/or the second geographic region. This may allow the cargo logistics platform to identify a first subset of cargo transportation data that is compliant with first type of partnership and a second subset of cargo transportation data that is compliant with the second type of partnership. In this case, the cargo logistics platform may use the first subset of cargo transportation data and/or second subset of cargo transportation data when generating the first recommendation, as described further herein.

One or more implementations described above involve the cargo transportation platform obtaining all (or some) cargo transportation data and determining that a subset of that cargo transportation data complies with data sharing restrictions. In some implementations, the cargo logistics platform may obtain the subset of the cargo transportation data directly from the data structure and/or from one or more booking systems. For example, the cargo logistics platform may modify a search query when referencing the data structure such that the search query only returns cargo transportation data that is compliant with the data sharing restrictions associated with the identified types of partnerships.

As shown by reference number 112, the cargo logistics platform may obtain price data. For example, in some cases, price data may not have been included in the cargo transportation data that was previously provided to the cargo logistics platform. In these cases, the cargo logistics platform may convert the transportation availability request to one or more formats that are suitable for the set of booking systems and may provide converted transportation requests to the set of booking systems. This may cause the set of booking systems to display the converted transportation availability request via an interface, and to generate and provide the cargo logistics platform with the price data.

In other cases, the carrier and one or more partner carriers may have previously agreed upon a price or range of prices for the cargo. In these cases, the price data may be included as part of the cargo transportation data that was previously provided to the cargo logistics platform.

As shown by reference number 114, the cargo logistics platform may generate a first recommendation based on the subset of the cargo transportation data and/or the price data. For example, the cargo logistics platform may generate a first recommendation that specifies one or more recommended routes that particular vehicles are capable of traversing in order to assist in transporting the cargo between the first site and the second site.

In some implementations, the cargo logistics platform may generate the first recommendation using a set of route selection techniques. For example, the cargo logistics platform may perform a set of route selection techniques to generate scores that may be used to generate the first recommendation. The set of route selection techniques may include one or more route optimization techniques, one or more cost optimization techniques, and/or the like. The scores may include a set of route scores corresponding to a set of available routes, a set of cost scores for the set of available routes, and/or the like.

In some implementations, the cargo logistics platform may be configured with one or more threshold confidence values that may be used to identify recommended routes. For example, the cargo logistics platform may perform one or more route optimization techniques to generate route scores for the set of available routes (e.g., based on a total time to transport the cargo to the second site), may perform the one or more cost optimization techniques to generate cost scores for the set of available routes (e.g., based on a cost or predicted cost associated with taking each respective route), and/or the like. In this case, the cargo logistics platform may compare the route scores and the cost scores to one or more threshold confidence scores and may select particular routes, as recommended routes, based on the particular routes corresponding to particular scores (e.g., route scores and/or cost scores) that satisfy one or more of the threshold confidence scores.

To provide a specific example, the cargo logistics platform may generate a first recommendation that specifies one or more recommended routes between the first site and the second site. For example, the cargo logistics platform may have received a transportation availability request from the carrier. In this case, the cargo logistics platform may first validate the transportation availability request (e.g., by determining whether the transportation availability request includes proper terms, such as an arrival date, a departure date, and/or the like).

Next, the cargo logistics platform may identify a first set of routes that may be traversed by vehicles associated with the carrier, may identify one or more additional sets of routes that may be traversed by vehicles associated with one or more partner carriers and/or non-partnered carriers (e.g., that are enrolled in services provided by the cargo logistics platform, that are not enrolled in services provided by the cargo logistics platform, and/or the like). In this case, the cargo logistics platform may identify the first set of routes and the one or more additional sets of routes by interacting with the first booking system and the set of booking systems (e.g., which may include one or more booking systems of non-partnered carriers, one or more booking systems of carriers that are not enrolled in services provided by the cargo logistics platform, and/or the like), by interacting with one or more data structures, and/or the like.

In some cases, the cargo logistics platform may also perform a cost inquiry and compare prices (past prices, set prices, predicted prices, and/or the like) associated with particular segments of routes (e.g., which may be specific to each partner carrier, non-partnered carrier, and/or the like). In these cases, the cargo logistics platform may generate a set of simulated routes based on the cost inquiry (e.g., a route that combines segments or legs from one or more existing routes of vehicles of particular partner carriers and/or non-partnered carriers, a route that creates new segments or legs that did not previously exist, and/or the like).

Additionally, the cargo logistics platform may identify a set of route restrictions for the carrier and/or for one or more partner carriers. For example, the set of route restrictions may have been included in the transportation availability request, may be identified by searching one or more data structures associated with the first booking system and/or the one or more partner carriers, and/or the like. In this case, the cargo logistics platform may filter the first set of routes and the one or more additional sets of routes (collectively referred to as an updated set of routes) based on the set of route restrictions.

Additionally, or alternatively, the cargo logistics platform may further filter the updated set of routes based on a set of time restrictions. For example, the cargo logistics platform may filter the updated set of routes based on a transit time rule of the carrier (e.g., that specifies a rule that the carrier has relating to transit of the cargo, such as a mandatory delivery time or time period, a mandatory departure time or time period, and/or the like), a connection time rule of a partner carrier (e.g., that specifies a rule that a partner carrier has relating to transit of the cargo, such as a mandatory arrival time or arrival time period at an intermediary site along a route, a mandatory departure time or departure time period at the intermediary site along the route, and/or the like), an airport operating hour rule of a partner carrier, and/or the like.

Additionally, or alternatively, the cargo logistics platform may further filter the updated set of routes based on a set of distance restrictions. For example, the cargo logistics platform may filter the updated set of routes based on an overall distance rule (e.g., a certain route may include an intermediary stop that deviates too far from a path needed to satisfy a certain delivery window for the cargo, and/or the like), an administrator configured distance rule, and/or the like.

Additionally, or alternatively, the cargo logistics platform may further filter the updated set of routes to eliminate redundant route segments included in the remaining routes. Additionally, or alternatively, the cargo logistics platform may process the updated set of routes using a route optimization technique to determine a final set of routes. The final set of routes may be provided to the first booking system as part of the first recommendation.

To provide another example, the cargo logistics platform may receive a transportation availability request from the first site to the second site, and may need to deliver a first batch of cargo to a set of intermediary sites (e.g., a third site, a fourth site, a fifth site, and/or the like) between the first site and the second site and may need to deliver a second batch of cargo to the second site. In this example, the cargo logistics platform may identify a first set of routes associated with vehicles of the carrier and one or more additional sets of routes associated with one or more partner carriers, whereby each route traverses through at least one leg in the route (e.g., where a leg is defined as being between a site and another site that is a next stop in the route). The cargo logistics platform may identify the first set of routes and the one or more additional sets of routes by interacting with the first booking system and/or the set of booking systems, by interacting with one or more data structures, and/or the like, in a manner described elsewhere herein.

Continuing with the example, the cargo logistics platform may filter the first set routes and the one or more additional sets of routes (collectively referred to as an updated set of routes) using a set of route restrictions, a set of time restrictions, a set of distance restrictions, and/or the like, as each described elsewhere herein. Moreover, the cargo logistics platform may further filter the updated set of routes based on a type of partnership between the carrier and particular partner carriers. For example, the cargo logistics platform may identify a type of partnership between the carrier and each of the one or more partner carriers and may filter the updated set of routes based on identified types of partnerships. This may allow the cargo logistics platform to process the updated set of routes using the one or more route optimization techniques to determine a final set of routes that may be included in a first recommendation. In this way, the cargo logistics platform generates an end-to-end route that may be traversed by vehicles of the carrier and one or more partner carriers (e.g., to deliver the cargo to the one or more intermediary sites and/or to the second site).

In some implementations, the cargo logistics platform may generate the first recommendation using a data model. For example, as described above, the cargo logistics platform may have trained a data model. This may allow the cargo logistics platform to provide, as input to the data model, an identifier of the carrier, particular capacity data that indicates an amount of capacity needed to transport the cargo, the cargo transportation data for the set of partner carriers (or a subset of that data that is compliant with data sharing restrictions), and/or price data (or a subset of that data that is compliant with data sharing restrictions) to cause the data model to output a set of route scores for the set of available routes. In this case, the cargo logistics platform may select the one or more recommended routes, from the set of available routes, based on one or more route scores (e.g., that correspond to the one or more recommended routes) satisfying a threshold confidence score.

As a specific example, the cargo logistics platform may provide, as input to a first layer of a neural network, an identifier of the carrier, particular capacity data, cargo transportation data for one or more partner carriers, and/or price data (collectively referred to as input data). This may cause one or more intermediate layers of the neural network (e.g., a set of convolutional layers, a set of pooling layers, and/or a fully-connected layer to process the input data and to provide processed input data to a final a results layer of the neural network. For example, the neural network may apply a filter to the input data to generate a feature map. The feature map may be a matrix of values that represent likelihoods of particular routes being an optimal route. This may allow the fully-connected layer to process the feature map to identify a route that corresponds to a best-available route optimization score and to provide an identifier for the route and/or the best-available route optimization score to the results layer of the neural network.

As shown by reference number 116, the cargo logistics platform may provide the first recommendation to the first booking system. For example, the cargo logistics platform may provide the first recommendation to the first booking system to permit an individual associated with the carrier to view the first recommendation (e.g., which may be used to generate and provide a booking request, as described further herein).

In some implementations, the first booking system may make separate requests for route availability and capacity availability. For example, the first booking system may provide, to the cargo logistics platform, a route request for one or more available routes that are capable of being used to transport the cargo between the first site and the second site. Additionally, or alternatively, the first booking system may provide, to the cargo logistics platform, a capacity request for amounts of available capacity within vehicles. This allows the cargo logistics platform to service requests for specific types of data, thereby conserving resources relative to servicing the transportation available request (e.g., in situations where the carrier does not need all types of available data).

In some implementations, the cargo logistics platform may process other types of requests, such as a booking evaluation request. For example, the first booking system may want to have a particular recommended route evaluated by a partner carrier. In this case, the first booking system may provide the cargo logistics platform with a booking evaluation request that includes the particular recommended route that is to be evaluated. Additionally, the cargo logistics platform may convert the booking evaluation request to a format that is suitable to a booking system of the partner carrier and may provide the converted booking evaluation request to the booking system. This may cause the booking system to provide the cargo logistics platform with a booking evaluation response that includes an evaluation of the particular recommended route. Furthermore, the cargo logistics platform may convert the booking evaluation response to a format that is suitable for use by the first booking system of the carrier and may provide the first booking system with a converted booking evaluation response.

In this way, the cargo logistics platform generates a first recommendation that specifies one or more recommended routes that particular vehicles are capable of traversing in order to assist in transporting the cargo between the first site and the second site.

Figure 1C:
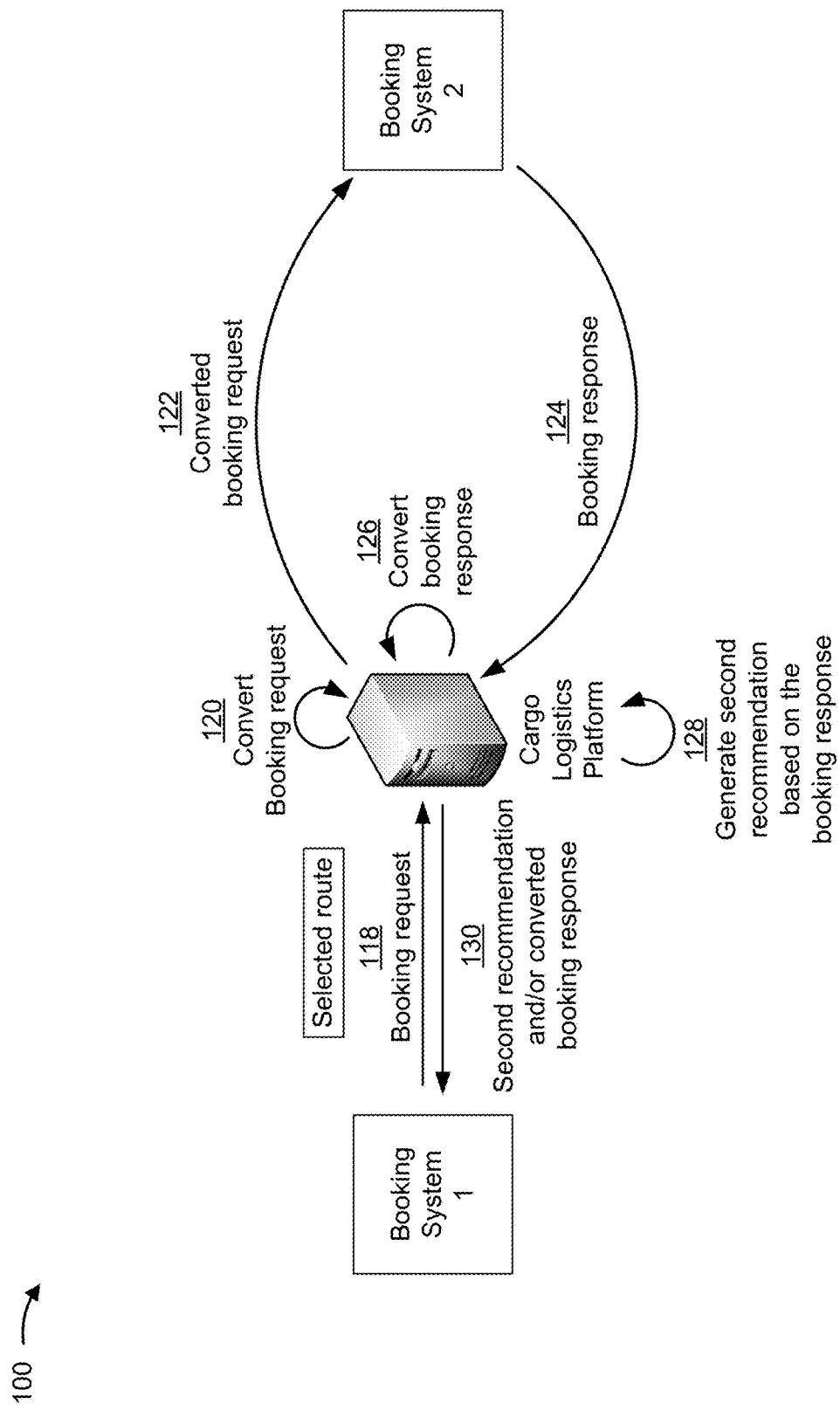

As shown in FIG. 1C, and by reference number 118, the cargo logistics platform may receive a booking request from the first booking system. For example, the first booking system may select a route, of the one or more recommended routes, and may provide the cargo logistics platform with a booking request to schedule delivery of the cargo via the selected route. The booking request may include the carrier identifier, route selection data that identifies the selected route (e.g., an origin site identifier, a destination site identifier, one or more intermediary site identifiers, geographic coordinates defining the selected route between the one or more stops of the selected route, and/or the like), price data that indicates an offered price for assisting in transporting the cargo, cargo data that identifies the cargo and/or a type of cargo, time data that identifies a delivery time (e.g., a scheduled delivery time, a recommended delivery time, and/or the like), and/or the like.

As shown by reference number 120, the cargo logistics platform may convert the booking request. For example, the cargo logistics platform may identify one or more booking systems that are associated with partner carriers that control vehicles assigned to the selected route. In the example shown, a second booking system (shown as Booking System 2) may be associated with a partner carrier that controls vehicles assigned to the selected route. Additionally, the cargo logistics platform may convert the booking request to a format that is compatible with the second booking system.

As shown by reference number 122, the cargo logistics platform may provide a converted booking request to the second booking system. This may allow the second booking system to generate a booking response. The booking response may indicate whether the partner carrier has accepted the booking request, rejected the booking request, made a counteroffer regarding one or more terms of the booking request, and/or the like. As shown by reference number 124, the second booking system may provide the booking response to the cargo logistics platform.

As shown by reference number 126, the cargo logistics platform may convert the booking response. For example, the cargo logistics platform may convert the booking response to a format that is compatible with the first booking system.

In some implementations, the cargo logistics platform may combine multiple booking responses into a master booking response. For example, if the selected route utilizes vehicles controlled by multiple partner carriers, the cargo logistics platform may provide booking requests to booking systems of multiple partner carriers and may receive booking responses from the booking systems. In this case, the cargo logistics platform may aggregate data included in the booking responses and may provide the aggregated data to the first booking system as part of the master booking response.

As shown by reference number 128, the cargo logistics platform may generate a second recommendation based on the booking response. For example, if the particular booking system provides a booking response indicating that the partner carrier will be unable to transport the cargo, the cargo logistics platform may generate a second recommendation to assist the carrier with selecting another partner carrier to assist in transporting the cargo. In this case, the cargo logistics platform may generate a second recommendation to select a particular route, of the one or more recommended routes that had been previously provided to the first system, and/or to select a new recommended route that may be determined by the cargo logistics platform (e.g., in a manner described elsewhere herein).

Additionally, or alternatively, the cargo logistics platform may generate a second recommendation that indicates whether to accept a counter-offer made by the partner carrier and/or whether to counter the counter-offer. For example, the cargo logistics platform may receive a booking response that includes a counter-offer made by the partner carrier. In some cases, the cargo logistics platform may perform an evaluation of the counter-offer and may generate, as part of the second recommendation, a recommendation indicating whether to accept the counter-offer. Additionally, or alternatively, the cargo logistics platform may generate a new counter-offer (e.g., with a revised price, and/or the like) and may include the new counter-offer in the second recommendation.

As shown by reference number 130, the cargo logistics platform may provide the first booking system with the second recommendation and/or the converted booking response. This may allow the first booking system to create a scheduled delivery plan for using the vehicles of the partner carrier to transport the cargo.

In this way, the cargo logistics platform assists the first booking system with scheduling transportation of the cargo using the vehicles of the partner carrier.

Figure 1D:
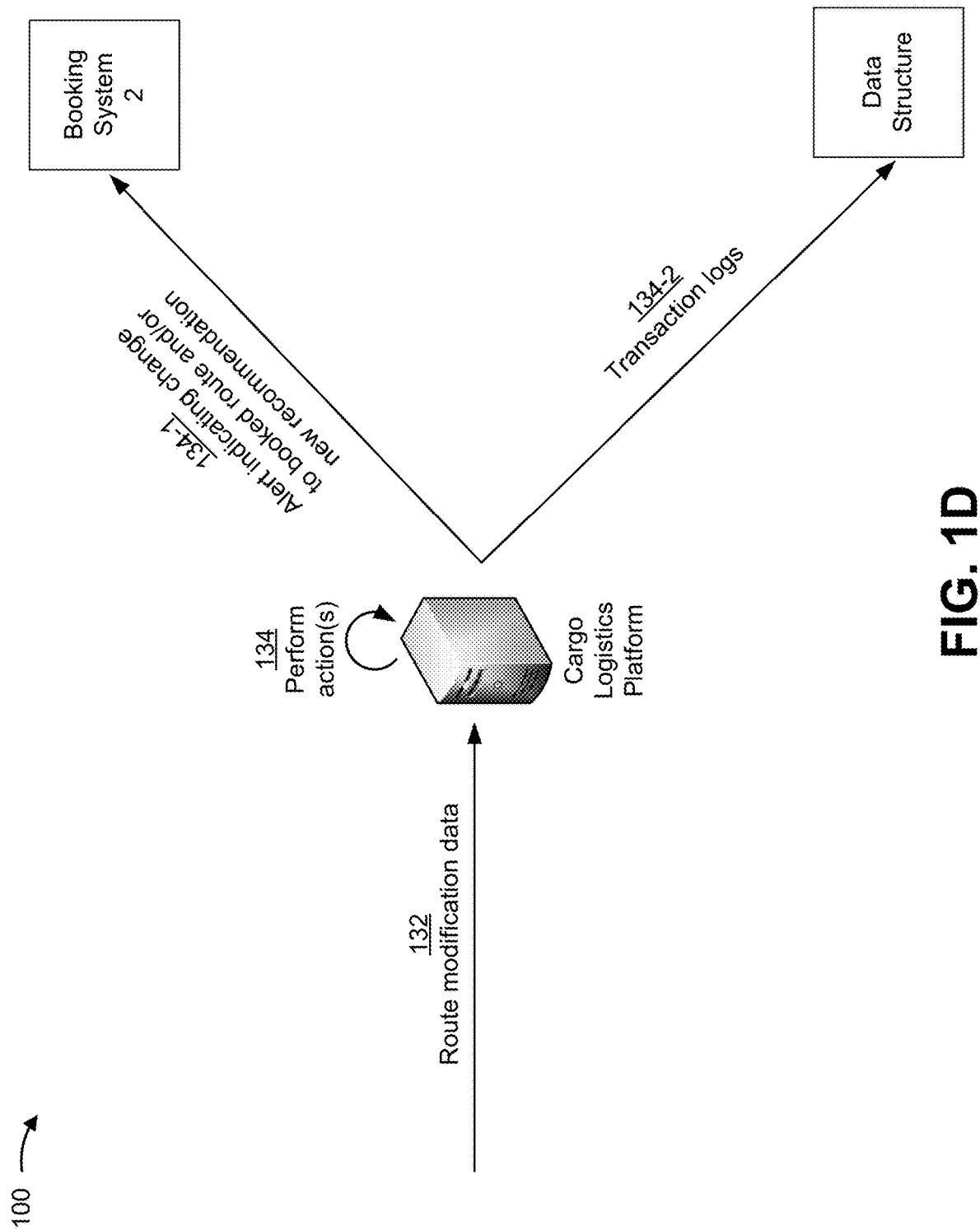

As shown in FIG. 1D, and by reference number 132, the cargo logistics platform may receive route modification data. For example, an event may occur that causes a change to the selected route (e.g., prior to the cargo reaching a destination site). The event may be a malfunction to a vehicle that is to transport the cargo, a cancellation made by the carrier or the partner carrier, weather that causes a delay in transporting the cargo, and/or the like. In some cases, a booking system (e.g., the first booking system and/or the second booking system of the partner carrier) may provide the route modification data to the cargo logistics platform. For example, a vehicle of the partner carrier that is assigned to transport the cargo may be delayed due to a malfunction. In this case, the second booking system may provide the route modification data to the cargo logistics platform to alert the cargo logistics platform of the delay.

In other cases, one or more other data storage devices may provide event data to the cargo logistics platform and the cargo logistics platform may generate route modification data based on the event data. For example, the cargo logistics platform may be provided with weather data that describes a weather forecast that will cause a delay in transportation of the cargo. In this case, the cargo logistics platform may process the weather data to determine that the weather forecast will cause a delay in a geographic area of the selected route, during a time in which the cargo is to be transported. This may allow the cargo logistics platform to generate route modification data based on the weather data.

As shown by reference number 134, the cargo logistics platform may perform one or more actions based on receiving the route modification data. For example, as shown by reference number 134-1, the cargo logistics platform may, based on receiving the route modification data, alert the second booking system of the event affecting transportation of the cargo via the selected route (e.g., using one or more APIs of the cargo booking application).

Additionally, or alternatively, and provided as another example, the cargo logistics platform may, based on receiving the route modification data, generate and provide the second booking system with a new recommendation that includes one or more of the recommended routes that were not previously selected by the first booking system, one or more new routes, and/or the like. The one or more new routes may be determined in a manner consistent with that used to determine the one or more recommended routes.

In some implementations, the cargo logistics platform may generate transaction logs. For example, the cargo logistics platform may, over a given time period, generate transaction logs that describe a set of interactions that the first booking system and/or the set of booking systems have with the cargo logistics platform. The transaction logs may include data that identifies the booking system making an interaction, data that identifies a particular device within the booking system that is making an interaction, time data that indicates a time at which an interaction was made, and/or the like.

In some implementations, the cargo logistics platform may use the transaction logs to perform actions relating to traffic management, price recommendations, auditing, and/or the like. For example, the cargo logistics platform may process the transaction logs to identify trends relating to traffic patterns, such as a traffic pattern that causes a recurring delay, a traffic pattern that causes a vehicle to transport cargo ahead of an estimated delivery time, and/or the like. This may allow the cargo logistics platform to identify recommended changes that will improve overall traffic in a given geographic area. As another example, the cargo logistics platform may process the transaction logs to identify trends relating to prices that the carrier and particular partner carriers are commonly agreeing upon and/or rejecting. This may allow the cargo logistics platform to identify optimal price ranges and to recommend the price ranges to the carrier and/or the set of partner carriers in subsequent transactions. In some cases, the cargo logistics platform may use one or more machine learning techniques to train a data model on the transaction logs and may perform one or more of the actions described above using the data model.

In this way, the cargo logistics platform efficiently and effectively assists the carrier in scheduling transportation of the cargo (e.g., via a route that uses one or more vehicles of the partner carrier).

As indicated above, FIGS. 1A-1D are provided merely as one or more examples. Other examples may differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
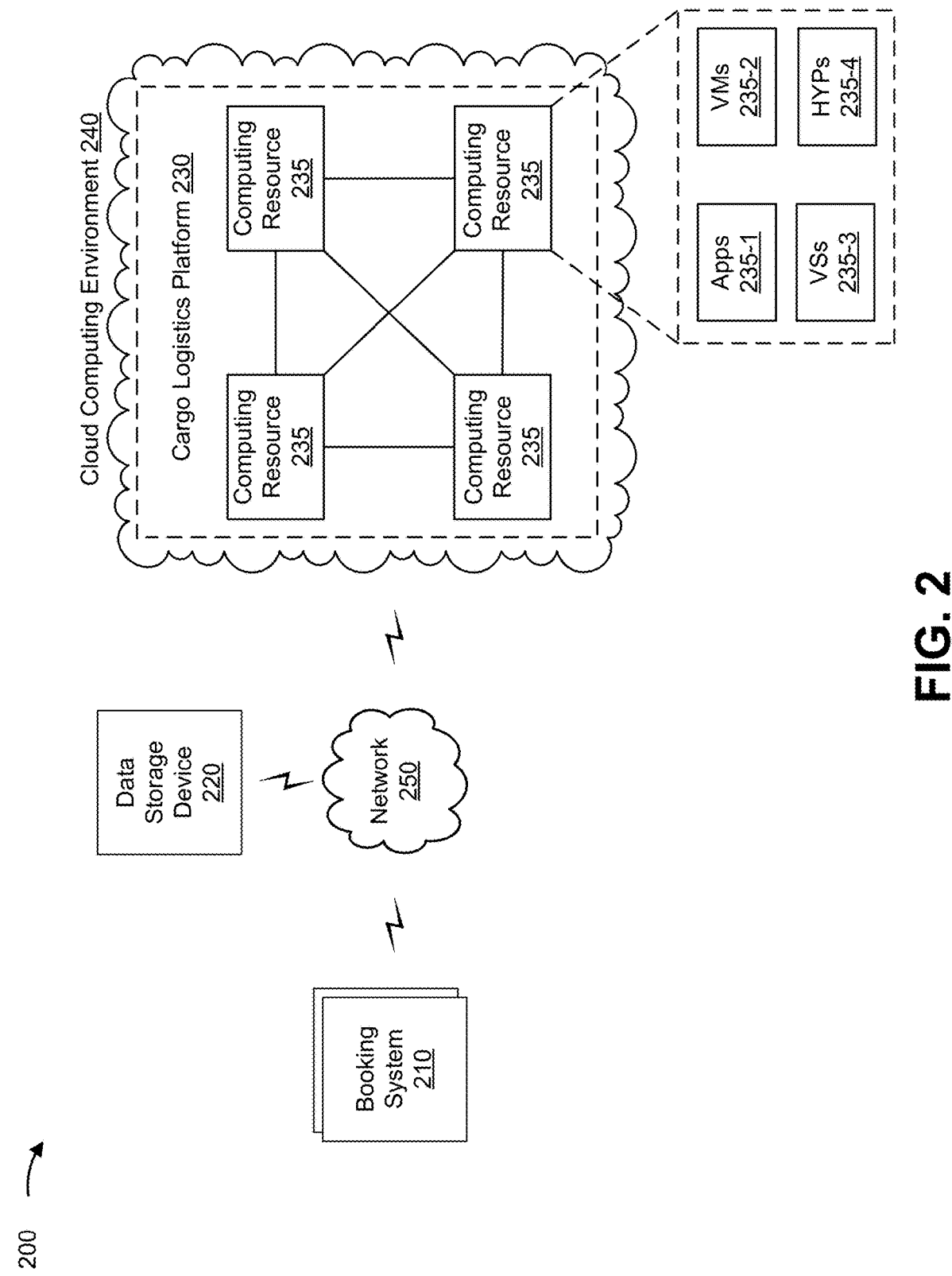
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a booking system 210, a data storage device 220, a cargo logistics platform 230 hosted within a cloud computing environment 240, and/or a network 250. Devices of environment 200 may interconnect via wired connections, wireless connections, or a combination of wired and wireless connections.

Booking system 210 includes one or more devices capable of receiving, storing, generating, determining, processing, and/or providing information associated with scheduling and/or managing transportation of cargo. For example, booking system 210 may include a server device or a group of server devices. In some implementations, a first booking system 210 may be associated with a carrier. Additionally, or alternatively, one or more other booking systems 210 may be associated with one or more partner carriers.

In some implementations, booking system 210 may store cargo transportation data associated with a carrier and/or a partner carrier. In some implementations, booking system 210 may have a local technology infrastructure that is used to schedule transportation of cargo. In some implementations, booking system 210 may have access to a cargo booking application that may assist in scheduling transportation of the cargo. In some implementations, booking system 210 may use one or more application programming interfaces (APIs) and/or protocols to communicate with cargo logistics platform 230 (e.g., via the cargo booking application).

In some implementations, booking system 210 may provide cargo transportation data to cargo logistics platform 230. In some implementations, booking system 210 may provide a request to cargo logistics platform 230 to cause cargo logistics platform 230 to provide booking system 210 with a response. The request may be a transportation availability request, a route request, a capacity request, a booking evaluation request, a booking request, and/or the like. The response may be a transportation availability response, a route response, a capacity response, a booking evaluation response, a booking response, and/or the like. In some implementations, booking system 210 may receive a recommendation from cargo logistics platform 230.

Data storage device 220 includes one or more devices capable of receiving, storing, generating, determining, and/or providing information associated with transportation of cargo. For example, data storage device 220 may include a server device or a group of server devices. In some implementations, data storage device 220 may store data described in connection with FIGS. 1A-1D. In some implementations, data storage device 220 may receive the data from and/or may provide the data to cargo logistics platform 230.

Cargo logistics platform 230 includes one or more devices capable of receiving, storing, generating, determining, and/or providing information associated with scheduling and/or managing transportation of cargo. For example, cargo logistics platform 230 may include a server device (e.g., a host server, a web server, an application server, and/or the like), a data center device, or a similar device.

In some implementations, cargo logistics platform 230 may host and/or support a cargo booking application. The cargo booking application may be a mobile application, a desktop application, a web application, and/or the like. In some implementations, cargo logistics platform 230 may be configured with an exchange connection component that enables communication between booking system 210 to use the cargo booking application to communicate with cargo logistics platform 230. The exchange connection component may support different types of APIs and/or protocols to send messages between cargo logistics platform 230 and particular booking systems 210, different types of nomenclature, conversions between data types used in a given booking system 210 and a standardized data type supported by cargo logistics platform 230, and/or the like. In some implementations, the cargo booking application may be accessible via booking system 210 via one or more interfaces, such as a first interface for managing configurations associated with the cargo booking application, a second interface for assisting with onboarding a carrier and/or a partner carrier, a third interface for requesting and/or receiving data in connection with one or more services provided by the cargo booking application, and/or the like.

In some implementations, cargo logistics platform 230 may support one or functions and/or features of the cargo booking application using a schedule processing engine, a path generation, a route engine, a request processing engine, a response processing engine, a machine learning engine, and/or the like. For example, one or more of these engines may be used to support functionality described in connection with FIGS. 1A-1D. In some implementations, cargo logistics platform 230 may support one or more server authentication techniques (e.g., a technique using a transport layer security (TLS) protocol, and/or the like), one or more client authentication techniques (e.g., a technique using open authorization (OAuth), and/or the like), and/or the like.

In some implementations, as shown, cargo logistics platform 230 may be hosted in cloud computing environment 240. In some implementations, cargo logistics platform 230 might not be cloud-based (i.e., may be implemented outside of a cloud computing environment) or may be partially cloud-based.

Cloud computing environment 240 includes an environment that hosts cargo logistics platform 230. Cloud computing environment 240 may provide computation, software, data access, storage, and/or the like services that do not require end-user knowledge of a physical location and configuration of system(s) and/or device(s) that hosts cargo logistics platform 230. As shown, cloud computing environment 240 may include a group of computing resources 235 (referred to collectively as "computing resources 235" and individually as "computing resource 235").

Computing resource 235 includes one or more personal computers, workstation computers, server devices, and/or another type of computation and/or communication device. In some implementations, computing resource 235 may host cargo logistics platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by booking system 210 and/or data storage device 220. Application 235-1 may eliminate a need to install and execute the software applications on these devices. For example, application 235-1 may include software associated with cargo logistics platform 230 and/or any other software capable of being provided via cloud computing environment 240. In some implementations, one application 235-1 may send/ receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., booking system 210, data storage device 220, and/or the like), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
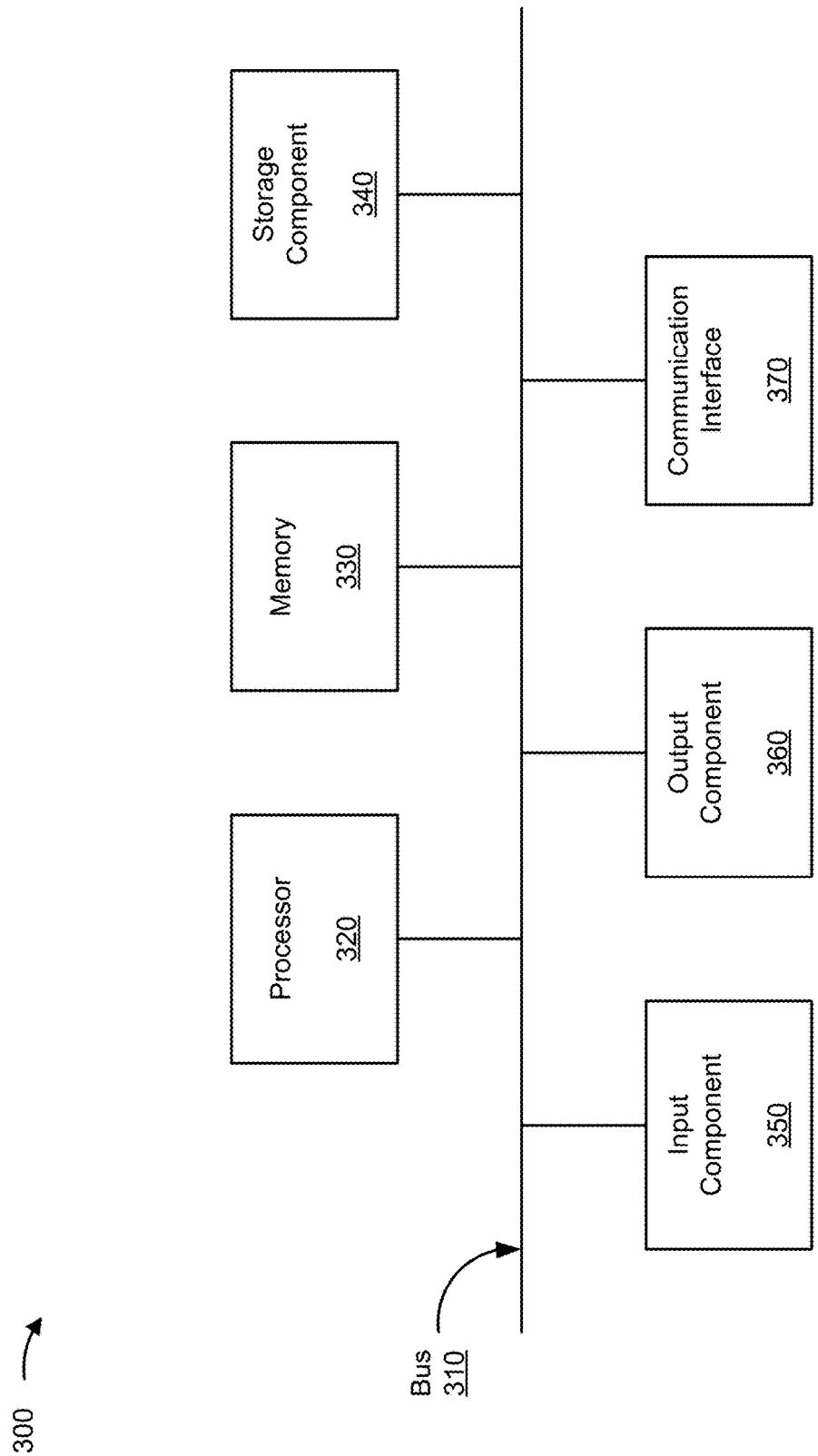
FIG. 3 is a diagram of example components of one or more devices of FIG. 2.

FIG. 3 is a diagram of example components of a device 300. Device 300 may correspond to booking system 210, data storage device 220, and/or cargo logistics platform 230. In some implementations, booking system 210, data storage device 220, and/or cargo logistics platform 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A and 4B are a flowchart of an example process 400 for assisting a carrier in scheduling transportation of cargo between a first site and a second site, where one or more vehicles associated with one or more partner carriers are to assist with transportation of the cargo. In some implementations, one or more process blocks of FIGS. 4A and 4B may be performed by a cargo logistics platform (e.g., cargo logistics platform 230). In some implementations, one or more process blocks of FIGS. 4A and 4B may be performed by another device or a group of devices separate from or including the cargo logistics platform, such as a booking system (e.g., booking system 210), a data storage device (e.g., data storage device 220), and/or the like.

As shown in FIG. 4A, process 400 may include receiving global reference data that includes location data for sites that are used as stops while transporting particular cargo (block 405). For example, the cargo logistics platform (e.g., using computing resource 225, processor 320, memory 330, storage component 340, input component 350, communication interface 370, and/or the like) may receive global reference data that includes location data for sites that are used as stops while transporting particular cargo, as described above.

As further shown in FIG. 4A, process 400 may include receiving cargo transportation data from systems associated with a carrier and a set of partner carriers, wherein the cargo transportation data includes two or more of: routing data for a set of routes that vehicles are capable of using to transport the particular cargo between the sites, capacity data that identifies amounts of available capacity within the vehicles, partnership data that identifies one or more types of partnerships between the carrier and respective partner carriers of the set of partner carriers, or price data that specifies rates for using the vehicles to transport the particular cargo between two or more of the sites, and wherein a first format used to communicate with a first system associated with the carrier is different from one or more other formats used to communicate with other systems associated with the set of partner carriers (block 410). For example, the cargo logistics platform (e.g., using computing resource 225, processor 320, memory 330, storage component 340, input component 350, communication interface 370, and/or the like) may receive cargo transportation data from systems associated with a carrier and a set of partner carriers, as described above.

In some implementations, the cargo transportation data may include two or more of: routing data for a set of routes that vehicles are capable of using to transport the particular cargo between the sites, capacity data that identifies amounts of available capacity within the vehicles, partnership data that identifies one or more types of partnerships between the carrier and respective partner carriers of the set of partner carriers, or price data that specifies rates for using the vehicles to transport the particular cargo between two or more of the sites. In some implementations, a first format may be used to communicate with a first system associated with the carrier is different from one or more other formats used to communicate with other systems associated with the set of partner carriers.

As further shown in FIG. 4A, process 400 may include storing the global reference data and the cargo transportation data using a data structure (block 415). For example, the cargo logistics platform (e.g., using computing resource 225, processor 320, memory 330, storage component 340, output component 360, communication interface 370, and/or the like) may store the global reference data and the cargo transportation data using a data structure, as described above.

As further shown in FIG. 4A, process 400 may include receiving, from the first system associated with the carrier, a transportation availability request that is to be used to schedule transportation of cargo between a first site and a second site, wherein the transportation availability request includes: a carrier identifier for the carrier, site data that identifies geographic locations of the first site and the second site, and particular capacity data that specifies an amount of capacity needed to transport the cargo (block 420). For example, the cargo logistics platform (e.g., using computing resource 225, processor 320, memory 330, storage component 340, input component 350, communication interface 370, and/or the like) may receive, from the first system associated with the carrier, a transportation availability request that is to be used to schedule transportation of cargo between a first site and a second site, as described above. In some implementations, the transportation availability request may include a carrier identifier for the carrier, site data that identifies geographic locations of the first site and the second site, and particular capacity data that specifies an amount of capacity needed to transport the cargo.

As shown in FIG. 4B, process 400 may include generating a recommendation that specifies one or more recommended routes, of the set of routes, that particular vehicles, of the vehicles, are capable of traversing in order to assist in transporting the cargo between the first site and the second site, wherein the recommendation is based on the global reference data, the cargo transportation data, and contents of the transportation availability request (block 425). For example, the cargo logistics platform (e.g., using computing resource 225, processor 320, memory 330, storage component 340, and/or the like) may generate a recommendation that specifies one or more recommended routes, of the set of routes, that particular vehicles, of the vehicles, are capable of traversing in order to assist in transporting the cargo between the first site and the second site. In some implementations, the recommendation may be based on the global reference data, the cargo transportation data, and contents of the transportation availability request, as described above.

As further shown in FIG. 4B, process 400 may include providing the recommendation to the first system (block 430). For example, the cargo logistics platform (e.g., using computing resource 225, processor 320, memory 330, storage component 340, output component 360, communication interface 370, and/or the like) may provide the recommendation to the first system, as described above.

As further shown in FIG. 4B, process 400 may include receiving, from the first system, a booking request that includes route selection data that identifies a selected route, of the one or more recommended routes, that one or more vehicles, of the particular vehicles, are to use to transport the cargo (block 435). For example, the cargo logistics platform (e.g., using computing resource 225, processor 320, memory 330, storage component 340, input component 350, communication interface 370, and/or the like) may receive, from the first system, a booking request that includes route selection data that identifies a selected route, of the one or more recommended routes, that one or more vehicles, of the particular vehicles, are to use to transport the cargo, as described above.

As further shown in FIG. 4B, process 400 may include providing the booking request to one or more other systems associated with one or more partner carriers of the set of partner carriers (block 440). For example, the cargo logistics platform (e.g., using computing resource 225, processor 320, memory 330, storage component 340, output component 360, communication interface 370, and/or the like) may provide the booking request to one or more other systems associated with one or more partner carriers of the set of partner carriers, as described above.

As further shown in FIG. 4B, process 400 may include receiving one or more booking responses from the one or more other systems (block 445). For example, the cargo logistics platform (e.g., using computing resource 225, processor 320, memory 330, storage component 340, input component 350, communication interface 370, and/or the like) may receive one or more booking responses from the one or more other systems, as described above.

As further shown in FIG. 4B, process 400 may include providing, to the first system, an indication of whether the one or more partner carriers have provided confirmation of assistance in transporting the cargo between the first site and the second site (block 450). For example, the cargo logistics platform (e.g., using computing resource 225, processor 320, memory 330, storage component 340, output component 360, communication interface 370, and/or the like) may provide, to the first system, an indication of whether the one or more partner carriers have provided confirmation of assistance in transporting the cargo between the first site and the second site, as described above.

Process 400 may include additional implementations, such as any single implementation or any combination of implementations described below and/or in connection with one or more other processes described elsewhere herein.

In some implementations, when receiving the cargo transportation data the cargo logistics platform may receive, from the first system associated with the carrier, a first portion of the cargo transportation data that is in the first format, and may receive, from the one or more other systems associated with the set of partner carriers, a second portion of the cargo transportation data that is in the one or more other formats. In some implementations, when storing the cargo transportation data, the cargo logistics platform may store the cargo transportation data in a manner that associates the first portion of the cargo transportation and the second portion of the cargo transportation data with a set of storage identifiers that are in a uniform format.

In some implementations, the cargo logistics platform may identify the one or more types of partnerships between the carrier and the respective partner carriers by using the carrier identifier to reference the partnership data stored via the data structure. In some implementations, the cargo logistics platform may identify a set of data sharing restrictions based on the one or more types of partnerships. In some implementations, when generating the recommendation, the cargo logistics platform may generate the recommendation based on a subset of the cargo transportation data that excludes particular cargo transportation data that fails to comply with the set of data sharing restrictions.

In some implementations, the selected route may include a set of stops that include one or more intermediary sites and the second site. In some implementations, the one or more vehicles may be a selected set of vehicles. In some implementations, a first subset of vehicles, of the selected set of vehicles, may be assigned to transport the cargo to a first subset of the set of stops, where the first subset of vehicles is controlled by a first partner carrier of the set of partner carriers. In some implementations, a second subset of vehicles, of the selected set of vehicles, may be assigned to transport the cargo to a second subset of the set of stops. In some implementations, the second subset of vehicles may be controlled by a second partner carrier of the set of partner carriers.

In some implementations, when generating the recommendation, the cargo logistics platform may identify the amount of capacity needed to transport the cargo between the first site and the second site, may compare the amount of capacity and particular amounts of available capacity on the vehicles, may determine that a set of vehicles, of the vehicles, have a sufficient amount of available capacity based on comparing the amount of capacity and the particular amounts of available capacity, and may perform a route optimization technique to process specific route data for a subset of routes, of the set of routes, that are assigned to the set of vehicles, to identify the one or more recommended routes, from the subset of routes, that are assigned to the particular vehicles.

In some implementations, when generating the recommendation, the cargo logistics platform may generate the recommendation based on the route data, the capacity data, and particular partnership data that indicates that the carrier has a first type of partnership with a first partner carrier and indicates that the carrier has a second type of partnership with at least one other partner carrier of the set of partner carriers. In some implementations, when generating the recommendation, the cargo logistics platform may generate the recommendation based on the global reference data, the route data, the capacity data, the partnership data, the price data, and the contents of the transportation availability request.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
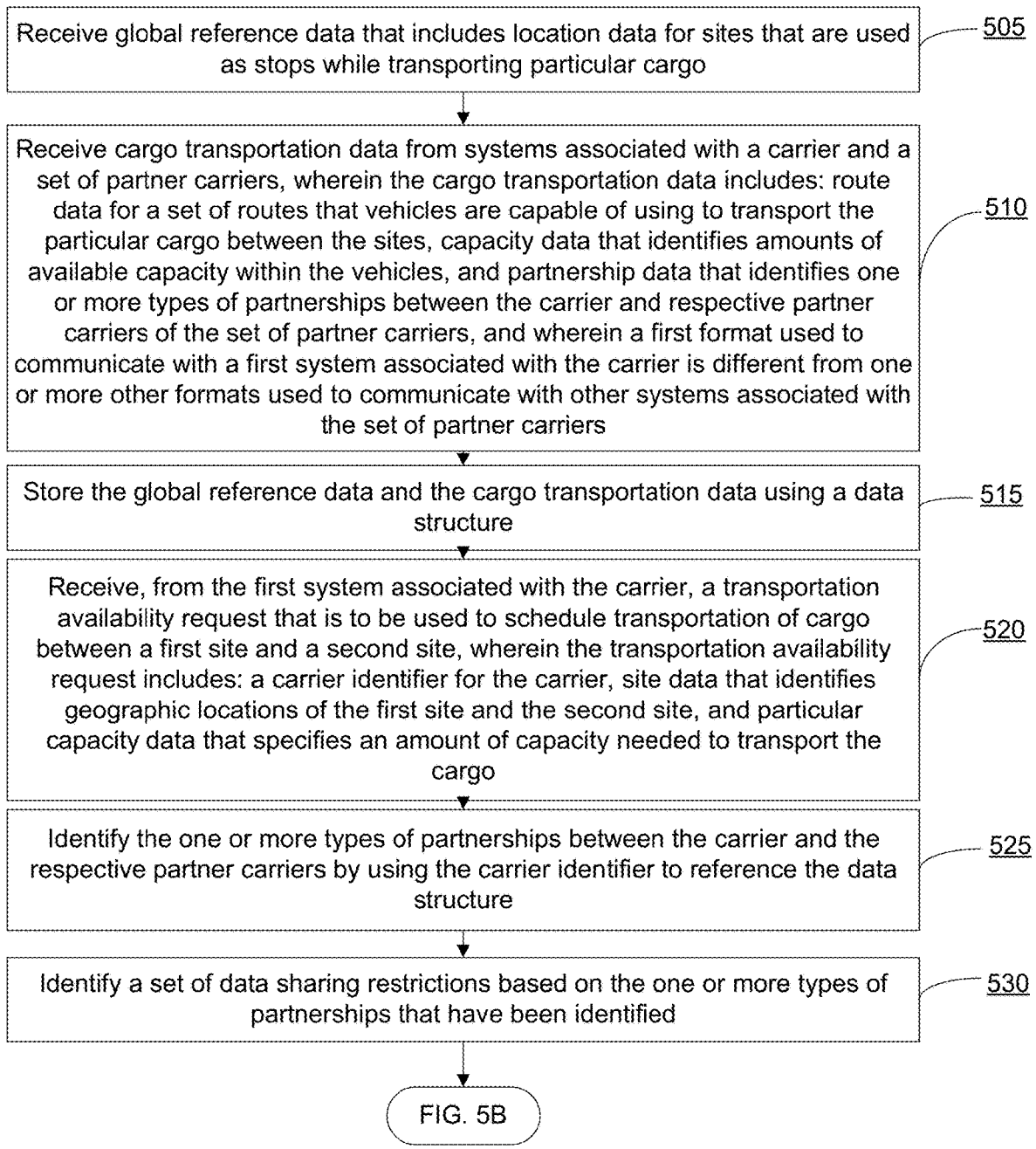

FIGS. 5A and 5B are a flowchart of an example process 500 for assisting a carrier in scheduling transportation of cargo between a first site and a second site, where one or more vehicles associated with one or more partner carriers are to assist with transportation of the cargo. In some implementations, one or more process blocks of FIGS. 5A and 5B may be performed by a cargo logistics platform (e.g., cargo logistics platform 230). In some implementations, one or more process blocks of FIGS. 5A and 5B may be performed by another device or a group of devices separate from or including the cargo logistics platform, such as a booking system (e.g., booking system 210), a data storage device (e.g., data storage device 220), and/or the like.

As shown in FIG. 5A, process 500 may include receiving global reference data that includes location data for sites that are used as stops while transporting particular cargo (block 505). For example, the cargo logistics platform (e.g., using computing resource 225, processor 320, memory 330, storage component 340, input component 350, communication interface 370, and/or the like) may receive global reference data that includes location data for sites that are used as stops while transporting particular cargo, as described above.

As further shown in FIG. 5A, process 500 may include receiving cargo transportation data from systems associated with a carrier and a set of partner carriers wherein the cargo transportation data includes: route data for a set of routes that vehicles are capable of using to transport the particular cargo between the sites, capacity data that identifies amounts of available capacity within the vehicles, and partnership data that identifies one or more types of partnerships between the carrier and respective partner carriers of the set of partner carriers, and wherein a first format used to communicate with a first system associated with the carrier is different from one or more other formats used to communicate with other systems associated with the set of partner carriers (block 510). For example, the cargo logistics platform (e.g., using computing resource 225, processor 320, memory 330, storage component 340, input component 350, communication interface 370, and/or the like) may receive cargo transportation data from systems associated with a carrier and a set of partner carriers, as described above. In some implementations, the cargo transportation data may include: route data for a set of routes that vehicles are capable of using to transport the particular cargo between the sites, capacity data that identifies amounts of available capacity within the vehicles, and partnership data that identifies one or more types of partnerships between the carrier and respective partner carriers of the set of partner carriers. In some implementations, a first format used to communicate with a first system associated with the carrier may be different from one or more other formats used to communicate with other systems associated with the set of partner carriers.

As further shown in FIG. 5A, process 500 may include storing the global reference data and the cargo transportation data using a data structure (block 515). For example, the cargo logistics platform (e.g., using computing resource 225, processor 320, memory 330, storage component 340, output component 360, communication interface 370, and/or the like) may store the global reference data and the cargo transportation data using a data structure, as described above.

As further shown in FIG. 5A, process 500 may include receiving, from the first system associated with the carrier, a transportation availability request that is to be used to schedule transportation of cargo between a first site and a second site, wherein the transportation availability request includes: a carrier identifier for the carrier, site data that identifies geographic locations of the first site and the second site, and particular capacity data that specifies an amount of capacity needed to transport the cargo (block 520). For example, the cargo logistics platform (e.g., using computing resource 225, processor 320, memory 330, storage component 340, input component 350, communication interface 370, and/or the like) may receive, from the first system associated with the carrier, a transportation availability request that is to be used to schedule transportation of cargo between a first site and a second site, as described above. In some implementations, the transportation availability request may include: a carrier identifier for the carrier, site data that identifies geographic locations of the first site and the second site, and particular capacity data that specifies an amount of capacity needed to transport the cargo.

As further shown in FIG. 5A, process 500 may include identifying the one or more types of partnerships between the carrier and the respective partner carriers by using the carrier identifier to reference the data structure (block 525). For example, the cargo logistics platform (e.g., using computing resource 225, processor 320, memory 330, storage component 340, and/or the like) may identify the one or more types of partnerships between the carrier and the respective partner carriers by using the carrier identifier to reference the data structure, as described above.

As further shown in FIG. 5A, process 500 may include identifying a set of data sharing restrictions based on the one or more types of partnerships that have been identified (block 530). For example, the cargo logistics platform (e.g., using computing resource 225, processor 320, memory 330, storage component 340, and/or the like) may identify a set of data sharing restrictions based on the one or more types of partnerships that have been identified, as described above.

As shown in FIG. 5B, process 500 may include generating a recommendation that specifies one or more recommended routes, of the set of routes, that particular vehicles, of the vehicles, are capable of traversing in order to assist in transporting the cargo between the first site and the second site, wherein the recommendation is based on the global reference data, contents of the transportation availability request, and a subset of the cargo transportation data that excludes particular cargo transportation data that fails to comply with the set of data sharing restrictions (block 535). For example, the cargo logistics platform (e.g., using computing resource 225, processor 320, memory 330, storage component 340, and/or the like) may generate a recommendation that specifies one or more recommended routes, of the set of routes, that particular vehicles, of the vehicles, are capable of traversing in order to assist in transporting the cargo between the first site and the second site, as described above. In some implementations, the recommendation may be based on the global reference data, contents of the transportation availability request, and a subset of the cargo transportation data that excludes particular cargo transportation data that fails to comply with the set of data sharing restrictions.

As further shown in FIG. 5B, process 500 may include providing the recommendation to the first system (block 540). For example, the cargo logistics platform (e.g., using computing resource 225, processor 320, memory 330, storage component 340, output component 360, communication interface 370, and/or the like) may provide the recommendation to the first system, as described above.

As further shown in FIG. 5B, process 500 may include receiving, from the first system, a booking request that includes route selection data that identifies a selected route, of the one or more recommended routes, that one or more vehicles, of the particular vehicles, are to use to transport the cargo (block 545). For example, the cargo logistics platform (e.g., using computing resource 225, processor 320, memory 330, storage component 340, input component 350, communication interface 370, and/or the like) may receive, from the first system, a booking request that includes route selection data that identifies a selected route, of the one or more recommended routes, that one or more vehicles, of the particular vehicles, are to use to transport the cargo, as described above.

As further shown in FIG. 5B, process 500 may include providing the booking request to one or more other systems associated with one or more partner carriers of the set of partner carriers (block 550). For example, the cargo logistics platform (e.g., using computing resource 225, processor 320, memory 330, storage component 340, output component 360, communication interface 370, and/or the like) may provide the booking request to one or more other systems associated with one or more partner carriers of the set of partner carriers, as described above.

As further shown in FIG. 5B, process 500 may include receiving one or more booking responses from the one or more other systems (block 555). For example, the cargo logistics platform (e.g., using computing resource 225, processor 320, memory 330, storage component 340, input component 350, communication interface 370, and/or the like) may receive one or more booking responses from the one or more other systems, as described above.

As further shown in FIG. 5B, process 500 may include providing, to the first system, an indication of whether the one or more partner carriers have provided confirmation of assistance in transporting the cargo between the first site and the second site (block 560). For example, the cargo logistics platform (e.g., using computing resource 225, processor 320, memory 330, storage component 340, output component 360, communication interface 370, and/or the like) may provide, to the first system, an indication of whether the one or more partner carriers have provided confirmation of assistance in transporting the cargo between the first site and the second site, as described above.

Process 500 may include additional implementations, such as any single implementation or any combination of implementations described below and/or in connection with one or more other processes described elsewhere herein.

In some implementations, the set of data sharing restrictions may include at least one of: a first restriction that prevents the carrier and a particular partner carrier from sharing particular price data, a second restriction that prevents the carrier and the particular partner carrier from sharing particular types of data (e.g., types of data other than price data, such as capacity data and/or any other data that may be identified by a partnership agreement as impermissible data to share (e.g., data that gives a carrier an unfair competitive advantage in the market, and/or the like)), or a third restriction that limits the first restriction or the second restriction to a given geographic area.

In some implementations, a partner carrier, of the set of partner carriers, may control the one or more vehicles that are assigned to the selected route identified in the booking request. In some implementations, the carrier and the partner carrier may have a first type of partnership that is active in a first geographic area and a second type of partnership that is active in a second geographic area. In some implementations, the selected route may involve transporting the cargo through the first geographic area and the second geographic area.

In some implementations, the selected route may include a set of stops that include one or more intermediary sites and the second site. In some implementations, the one or more vehicles may be a selected set of vehicles. In some implementations, a first subset of vehicles, of the selected set of vehicles, may be assigned to transport the cargo to a first subset of the set of stops. In some implementations, the first subset of vehicles may be controlled by a first partner carrier of the set of partner carriers. In some implementations, a second subset of vehicles, of the selected set of vehicles, may be assigned to transport the cargo to a second subset of the set of stops. In some implementations, the second subset of vehicles may be controlled by a second partner carrier of the set of partner carriers.

In some implementations, when generating the recommendation, the cargo logistics platform may identify the amount of capacity needed to transport the cargo between the first site and the second site, may compare the amount of capacity and particular amounts of available capacity on the vehicles, may determine that a set of vehicles, of the vehicles, have a sufficient amount of available capacity based on comparing the amount of capacity and the particular amounts of available capacity, and may perform a route optimization technique to process specific route data for a subset of routes, of the set of routes, that are assigned to the set of vehicles, to identify the one or more recommended routes, from the subset of routes, that are assigned to the particular vehicles of the set of vehicles.

In some implementations, when generating the recommendation, the cargo logistics platform may compare the amount of capacity needed to transport the cargo between the first site and the second site and particular amounts of available capacity on the vehicles, may determine that a set of vehicles, of the vehicles, have a sufficient amount of available capacity based on comparing the amount of capacity and the particular amounts of available capacity, and may perform a route optimization technique to identify the one or more recommended routes that are assigned to the particular vehicles by processing specific route data for a subset of routes that are assigned to the set of vehicles.

In some implementations, the cargo transportation data may further include price data that specifies ranges of permissible rates for using the vehicles to transport the particular cargo between two or more of the sites. In some implementations, when generating the recommendation, the cargo logistics platform may generate the recommendation based on the price data.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6A:
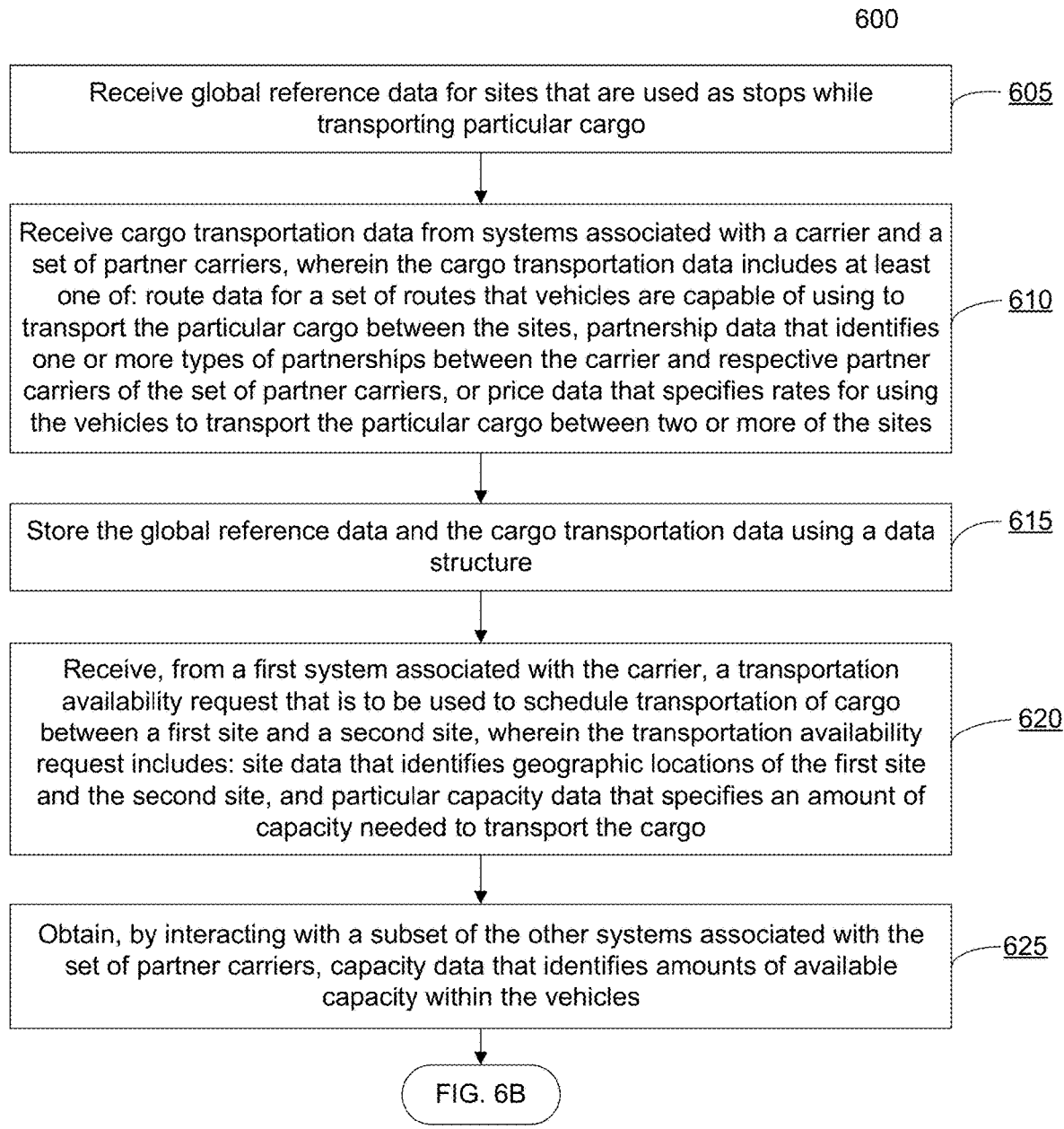

FIGS. 6A and 6B are a flowchart of an example process 600 for assisting a carrier in scheduling transportation of cargo between a first site and a second site, where one or more vehicles associated with one or more partner carriers are to assist with transportation of the cargo. In some implementations, one or more process blocks of FIGS. 6A and 6B may be performed by a cargo logistics platform (e.g., cargo logistics platform 230). In some implementations, one or more process blocks of FIGS. 6A and 6B may be performed by another device or a group of devices separate from or including the cargo logistics platform, such as a booking system (e.g., booking system 210), a data storage device (e.g., data storage device 220), and/or the like.

As shown in FIG. 6A, process 600 may include receiving global reference data for sites that are used as stops while transporting particular cargo (block 605). For example, the cargo logistics platform (e.g., using computing resource 225, processor 320, memory 330, storage component 340, input component 350, communication interface 370, and/or the like) may receive global reference data for sites that are used as stops while transporting particular cargo, as described above.

As further shown in FIG. 6A, process 600 may include receiving cargo transportation data from systems associated with a carrier and a set of partner carriers, wherein the cargo transportation data includes at least one of: route data for a set of routes that vehicles are capable of using to transport the particular cargo between the sites, partnership data that identifies one or more types of partnerships between the carrier and respective partner carriers of the set of partner carriers, or price data that specifies rates for using the vehicles to transport the particular cargo between two or more of the sites (block 610). For example, the cargo logistics platform (e.g., using computing resource 225, processor 320, memory 330, storage component 340, input component 350, communication interface 370, and/or the like) may receive cargo transportation data from systems associated with a carrier and a set of partner carriers, as described above. In some implementations, the cargo transportation data may include at least one of: route data for a set of routes that vehicles are capable of using to transport the particular cargo between the sites, partnership data that identifies one or more types of partnerships between the carrier and respective partner carriers of the set of partner carriers, or price data that specifies rates for using the vehicles to transport the particular cargo between two or more of the sites.

As further shown in FIG. 6A, process 600 may include storing the global reference data and the cargo transportation data using a data structure (block 615). For example, the cargo logistics platform (e.g., using computing resource 225, processor 320, memory 330, storage component 340, output component 360, communication interface 370, and/or the like) may store the global reference data and the cargo transportation data using a data structure, as described above.

As further shown in FIG. 6A, process 600 may include receiving, from a first system associated with the carrier, a transportation availability request that is to be used to schedule transportation of cargo between a first site and a second site wherein the transportation availability request includes: site data that identifies geographic locations of the first site and the second site, and particular capacity data that specifies an amount of capacity needed to transport the cargo (block 620). For example, the cargo logistics platform (e.g., using computing resource 225, processor 320, memory 330, storage component 340, input component 350, communication interface 370, and/or the like) may receive, from a first system associated with the carrier, a transportation availability request that is to be used to schedule transportation of cargo between a first site and a second site, as described above. In some implementations, the transportation availability request may include: site data that identifies geographic locations of the first site and the second site, and particular capacity data that specifies an amount of capacity needed to transport the cargo.

As further shown in FIG. 6A, process 600 may include obtaining, by interacting with a subset of the other systems associated with the set of partner carriers, capacity data that identifies amounts of available capacity within the vehicles (block 625). For example, the cargo logistics platform (e.g., using computing resource 225, processor 320, memory 330, storage component 340, input component 350, output component 360, communication interface 370, and/or the like) may obtain, by interacting with a subset of the other systems associated with the set of partner carriers, capacity data that identifies amounts of available capacity within the vehicles, as described above.

As shown in FIG. 6B, process 600 may include generating a recommendation that specifies one or more recommended routes, of the set of routes, that particular vehicles, of the vehicles, are capable of traversing in order to assist in transporting the cargo between the first site and the second site, wherein the recommendation is based on the global reference data, the cargo transportation data, contents of the transportation availability request, and the capacity data (block 630). For example, the cargo logistics platform (e.g., using computing resource 225, processor 320, memory 330, storage component 340, and/or the like) may generate a recommendation that specifies one or more recommended routes, of the set of routes, that particular vehicles, of the vehicles, are capable of traversing in order to assist in transporting the cargo between the first site and the second site, as described above. In some implementations, the recommendation is based on the global reference data, the cargo transportation data, contents of the transportation availability request, and the capacity data.

As further shown in FIG. 6B, process 600 may include providing the recommendation to the first system (block 635). For example, the cargo logistics platform (e.g., using computing resource 225, processor 320, memory 330, storage component 340, output component 360, communication interface 370, and/or the like) may provide the recommendation to the first system, as described above.

As further shown in FIG. 6B, process 600 may include receiving, from the first system, a booking request that includes route selection data that identifies a selected route, of the one or more recommended routes, that one or more vehicles, of the particular vehicles, are to use to transport the cargo (block 640). For example, the cargo logistics platform (e.g., using computing resource 225, processor 320, memory 330, storage component 340, input component 350, communication interface 370, and/or the like) may receive, from the first system, a booking request that includes route selection data that identifies a selected route, of the one or more recommended routes, that one or more vehicles, of the particular vehicles, are to use to transport the cargo, as described above.

As further shown in FIG. 6B, process 600 may include providing the booking request to one or more other systems associated with one or more partner carriers of the set of partner carriers (block 645). For example, the cargo logistics platform (e.g., using computing resource 225, processor 320, memory 330, storage component 340, output component 360, communication interface 370, and/or the like) may provide the booking request to one or more other systems associated with one or more partner carriers of the set of partner carriers, as described above.

As further shown in FIG. 6B, process 600 may include receiving one or more booking responses from the one or more other systems (block 650). For example, the cargo logistics platform (e.g., using computing resource 225, processor 320, memory 330, storage component 340, input component 350, communication interface 370, and/or the like) may receive one or more booking responses from the one or more other systems, as described above.

As further shown in FIG. 6B, process 600 may include providing, to the first system, an indication of whether the one or more partner carriers have provided confirmation of assistance in transporting the cargo between the first site and the second site (block 655). For example, the cargo logistics platform (e.g., using computing resource 225, processor 320, memory 330, storage component 340, output component 360, communication interface 370, and/or the like) may provide, to the first system, an indication of whether the one or more partner carriers have provided confirmation of assistance in transporting the cargo between the first site and the second site, as described above.

Process 600 may include additional implementations, such as any single implementation or any combination of implementations described below and/or in connection with one or more other processes described elsewhere herein.

In some implementations, a first format used to communicate with the first system associated with the carrier may be different from one or more other formats used to communicate with other systems associated with the set of partner carriers.

In some implementations, the transportation availability request may further include a carrier identifier for the carrier. In some implementations, the cargo logistics platform may identify the one or more types of partnerships between the carrier and the respective partner carriers by using the carrier identifier to reference the partnership data stored via the data structure, and may identify a set of data sharing restrictions based on the one or more types of partnerships. In some implementations, when generating the recommendation, the cargo logistics platform may generate the recommendation based on a subset of the cargo transportation data that excludes particular cargo transportation data that fails to comply with the set of data sharing restrictions.

In some implementations, the selected route may include a set of stops that include one or more intermediary sites and the second site. In some implementations, the one or more vehicles may be a selected set of vehicles. In some implementations, a first subset of vehicles, of the selected set of vehicles, may be assigned to transport the cargo to a first subset of the set of stops. In some implementations, the first subset of vehicles may be controlled by a first partner carrier of the set of partner carriers. In some implementations, a second subset of vehicles, of the selected set of vehicles, may be assigned to transport the cargo to a second subset of the set of stops. In some implementations, the second subset of vehicles may be controlled by a second partner carrier of the set of partner carriers.

In some implementations, when generating the recommendation, the cargo logistics platform may compare the amount of capacity needed to transport the cargo between the first site and the second site and particular amounts of available capacity on the vehicles, may determine that a set of vehicles, of the vehicles, have a sufficient amount of available capacity based on comparing the amount of capacity and the particular amounts of available capacity, and may perform a route optimization technique to process specific route data for a subset of routes, of the set of routes, that are assigned to the set of vehicles, to identify the one or more recommended routes, from the subset of routes, that are assigned to the particular vehicles of the set of vehicles.

In some implementations, when generating the recommendation, the cargo logistics platform may generate the recommendation based on the global reference data, the route data, the partnership data, the price data, the contents of the transportation availability request, and the capacity data.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, global reference data that includes location data for sites that are used as stops while transporting particular cargo;
   onboarding, by the device, a carrier and a set of partner carriers to associate cargo transportation data with the global reference data,
   wherein the cargo transportation data includes two or more of:
   route data for a set of routes that vehicles are capable of using to transport the particular cargo between the sites,
   capacity data that identifies amounts of available capacity within the vehicles, or
   partnership data that identifies one or more types of partnerships between the carrier and respective partner carriers of the set of partner carriers, and
   wherein a first format used to communicate with a first system associated with the carrier is different from one or more other formats used to communicate with other systems associated with the set of partner carriers;
   receiving, by the device, the cargo transportation data from systems associated with the carrier and the set of partner carriers;
   storing, by the device, the global reference data and the cargo transportation data using a data structure;
   performing, by the device, a test procedure to verify one or more communications between a first booking system of the carrier and a second booking system of a partner carrier, of the set of partner carriers, that has been onboarded;
   determining, by the device, that a threshold level of quality is satisfied based on performing the test procedure;
   receiving, by the device and based on determining that the threshold level of quality is satisfied, and from the first system associated with the carrier, a transportation availability request that is to be used to schedule transportation of cargo between a first site and a second site,
   wherein the transportation availability request includes:
   a carrier identifier for the carrier,
   site data that identifies geographic locations of the first site and the second site, and
   particular capacity data that specifies an amount of capacity needed to transport the cargo;
   converting, by the device, the transportation availability request to one or more formats that are compatible with a set of booking systems associated with the set of partner carriers;
   providing, by the device, the converted transportation availability request to the set of booking systems;
   receiving, by the device, price data from the set of booking systems,
   the price data specifying rates for using the vehicles to transport the particular cargo between two or more of the sites;
   generating, by the device, a recommendation that specifies one or more recommended routes, of the set of routes, that particular vehicles, of the vehicles, are capable of traversing in order to assist in transporting the cargo between the first site and the second site,
   wherein the recommendation is based on the global reference data, the cargo transportation data, the price data, and contents of the transportation availability request;
   providing, by the device, the recommendation to the first system;
   receiving, by the device and from the first system, a booking request that includes route selection data that identifies a selected route, of the one or more recommended routes, that one or more vehicles, of the particular vehicles, are to use to transport the cargo;
   providing, by the device, the booking request to one or more other systems associated with one or more partner carriers of the set of partner carriers;
   receiving, by the device, one or more booking responses from the one or more other systems;
   providing, by the device and to the first system, an indication of whether the one or more partner carriers have provided confirmation of assistance in transporting the cargo between the first site and the second site;
   generating, by the device, at least one transaction log that describes a set of interactions with the first system and the one or more other systems;
   processing, by the device, the at least one transaction log to identify trends relating to prices that are commonly agreed upon or rejected by the carrier and a particular partner carrier of the set of partner carriers; and
   recommending, by the device and based on the trends, price ranges in subsequent transactions to one or more of:
   the carrier, or
   the particular partner carrier.

2. The method of claim 1, wherein receiving the cargo transportation data comprises:
   receiving, from the first system associated with the carrier, a first portion of the cargo transportation data that is in the first format, and
   receiving, from the one or more other systems associated with the set of partner carriers, a second portion of the cargo transportation data that is in the one or more other formats; and
   wherein storing the cargo transportation data comprises:
   storing the cargo transportation data in a manner that associates the first portion of the cargo transportation and the second portion of the cargo transportation data with a set of storage identifiers that are in a uniform format.

3. The method of claim 1, further comprising:
   identifying the one or more types of partnerships between the carrier and the respective partner carriers by using the carrier identifier to reference the partnership data stored via the data structure;
   identifying a set of data sharing restrictions based on the one or more types of partnerships; and
   wherein generating the recommendation comprises:
   generating the recommendation based on a subset of the cargo transportation data that excludes particular cargo transportation data that fails to comply with the set of data sharing restrictions.

4. The method of claim 1, wherein the selected route includes a set of stops that include one or more intermediary sites and the second site;
   wherein the one or more vehicles are a selected set of vehicles;
   wherein a first subset of vehicles, of the selected set of vehicles, are assigned to transport the cargo to a first subset of the set of stops, wherein the first subset of vehicles is controlled by a first partner carrier of the set of partner carriers; and
wherein a second subset of vehicles, of the selected set of vehicles, are assigned to transport the cargo to a second subset of the set of stops,
wherein the second subset of vehicles are controlled by a second partner carrier of the set of partner carriers.

5. The method of claim 1, wherein generating the recommendation comprises:
identifying the amount of capacity needed to transport the cargo between the first site and the second site,
comparing the amount of capacity and particular amounts of available capacity on the vehicles,
determining that a set of vehicles, of the vehicles, have a sufficient amount of available capacity based on comparing the amount of capacity and the particular amounts of available capacity, and
performing a route optimization technique to process specific route data for a subset of routes, of the set of routes, that are assigned to the set of vehicles, to identify the one or more recommended routes, from the subset of routes, that are assigned to the particular vehicles.

6. The method of claim 1, wherein generating the recommendation comprises:
generating the recommendation based on the route data, the capacity data, and particular partnership data that indicates that the carrier has a first type of partnership with a first partner carrier and indicates that the carrier has a second type of partnership with at least one other partner carrier, of the set of partner carriers.

7. The method of claim 1, wherein generating the recommendation comprises:
generating the recommendation based on the global reference data, the route data, the capacity data, the partnership data, the price data, and the contents of the transportation availability request.

8. A device, comprising:
one or more memories; and
one or more processors, operatively coupled to the one or more memories, to:
receive global reference data that includes location data for sites that are used as stops while transporting particular cargo;
onboard a carrier and a set of partner carriers to associate cargo transportation data with the global reference data;
wherein the cargo transportation data includes:
route data for a set of routes that vehicles are capable of using to transport the particular cargo between the sites,
capacity data that identifies amounts of available capacity within the vehicles, and
partnership data that identifies one or more types of partnerships between the carrier and respective partner carriers of the set of partner carriers, and
wherein a first format used to communicate with a first system associated with the carrier is different from one or more other formats used to communicate with other systems associated with the set of partner carriers;
receive cargo transportation data from systems associated with the carrier and the set of partner carriers;
store the global reference data and the cargo transportation data using a data structure;
perform a test procedure to verify one or more communications between a first booking system of the carrier and a second booking system of a partner carrier, of the set of partner carriers, that has been onboarded;
determine that a threshold level of quality is satisfied based on performing the test procedure;
receive, from the first system associated with the carrier and based on determining that the threshold level of quality is satisfied, a transportation availability request that is to be used to schedule transportation of cargo between a first site and a second site,
wherein the transportation availability request includes:
a carrier identifier for the carrier,
site data that identifies geographic locations of the first site and the second site, and
particular capacity data that specifies an amount of capacity needed to transport the cargo;
identify the one or more types of partnerships between the carrier and the respective partner carriers by using the carrier identifier to reference the data structure;
identify a set of data sharing restrictions based on the one or more types of partnerships that have been identified;
convert the transportation availability request to one or more formats that are compatible with a set of booking systems associated with the set of partner carriers;
provide the converted transportation availability request to the set of booking systems;
receive price data from the set of booking systems,
the price data specifying rates for using the vehicles to transport the particular cargo between two or more of the sites;
generate a recommendation that specifies one or more recommended routes, of the set of routes, that particular vehicles, of the vehicles, are capable of traversing in order to assist in transporting the cargo between the first site and the second site,
wherein the recommendation is based on the global reference data, contents of the transportation availability request, the price data, and a subset of the cargo transportation data that excludes particular cargo transportation data that fails to comply with the set of data sharing restrictions;
provide the recommendation to the first system;
receive, from the first system, a booking request that includes route selection data that identifies a selected route, of the one or more recommended routes, that one or more vehicles, of the particular vehicles, are to use to transport the cargo;
provide the booking request to one or more other systems associated with one or more partner carriers of the set of partner carriers;
receive one or more booking responses from the one or more other systems;
provide, to the first system, an indication of whether the one or more partner carriers have provided confirmation of assistance in transporting the cargo between the first site and the second site;
generate at least one transaction log that describes a set of interactions with the first system and the one or more other systems;
process the at least one transaction log to identify trends relating to prices that are commonly agreed upon or rejected by the carrier and a particular partner carrier of the set of partner carriers; and
recommend, based on the trends, price ranges in subsequent transactions to one or more of:
the carrier, or
the particular partner carrier.

9. The device of claim 8, wherein the set of data sharing restrictions includes at least one of:
a first restriction that prevents the carrier and the particular partner carrier from sharing particular price data,
a second restriction that prevents the carrier and the particular partner carrier from sharing particular types of data, or
a third restriction that limits the first restriction or the second restriction to a given geographic area.

10. The device of claim 8, wherein the particular partner carrier controls the one or more vehicles that are assigned to the selected route identified in the booking request; and
wherein the carrier and the particular partner carrier have a first type of partnership that is active in a first geographic area and a second type of partnership that is active in a second geographic area,
wherein the selected route involves transporting the cargo through the first geographic area and the second geographic area.

11. The device of claim 8, wherein the selected route includes a set of stops that include one or more intermediary sites and the second site;
wherein the one or more vehicles are a selected set of vehicles;
wherein a first subset of vehicles, of the selected set of vehicles, are assigned to transport the cargo to a first subset of the set of stops,
wherein the first subset of vehicles is controlled by a first partner carrier of the set of partner carriers; and
wherein a second subset of vehicles, of the selected set of vehicles, are assigned to transport the cargo to a second subset of the set of stops,
wherein the second subset of vehicles are controlled by a second partner carrier of the set of partner carriers.

12. The device of claim 8, wherein the one or more processors, when generating the recommendation, are to:
identify the amount of capacity needed to transport the cargo between the first site and the second site,
compare the amount of capacity and particular amounts of available capacity on the vehicles,
determine that a set of vehicles, of the vehicles, have a sufficient amount of available capacity based on comparing the amount of capacity and the particular amounts of available capacity, and
perform a route optimization technique to process specific route data for a subset of routes, of the set of routes, that are assigned to the set of vehicles, to identify the one or more recommended routes, from the subset of routes, that are assigned to the particular vehicles of the set of vehicles.

13. The device of claim 8, wherein the one or more processors, when generating the recommendation, are to:
compare the amount of capacity needed to transport the cargo between the first site and the second site and particular amounts of available capacity on the vehicles,
determine that a set of vehicles, of the vehicles, have a sufficient amount of available capacity based on comparing the amount of capacity and the particular amounts of available capacity, and
perform a route optimization technique to identify the one or more recommended routes that are assigned to the particular vehicles by processing specific route data for a subset of routes that are assigned to the set of vehicles.

14. The device of claim 8, wherein the transportation availability request further includes a carrier identifier for the carrier;
wherein the one or more processors are further to:
identify the one or more types of partnerships between the carrier and the respective partner carriers by using the carrier identifier to reference the partnership data stored via the data structure;
identify a set of restrictions based on the one or more types of partnerships,
the set of restrictions including:
a price restriction based on a first type of partnership of the one or more partnerships, or
a geographic restriction based on a second type of partnership of the one or more partnerships; and
wherein the one or more processors, when generating the recommendation, are to:
generate the recommendation based on the subset of the cargo transportation data that excludes particular cargo transportation data that fails to comply with the set of restrictions.

15. A non-transitory computer-readable medium storing instructions, the instructions comprising:
one or more instructions that, when executed by one or more processors of a device, cause the one or more processors to:
receive global reference data for sites that are used as stops while transporting particular cargo;
onboard a carrier and a set of partner carriers to associate cargo transportation data with the global reference data,
wherein the cargo transportation data includes at least one of:
route data for a set of routes that vehicles are capable of using to transport the particular cargo between the sites, or
partnership data that identifies one or more types of partnerships between the carrier and respective partner carriers of the set of partner carriers;
receive the cargo transportation data from systems associated with the carrier and the set of partner carriers,
store the global reference data and the cargo transportation data using a data structure;
perform a test procedure to verify one or more communications between a first booking system of the carrier and a second booking system of a partner carrier, of the set of partner carriers, that has been onboarded;
determine that a threshold level of quality is satisfied based on performing the test procedure;
receive, from a first system associated with the carrier and based on determining that the threshold level of quality is satisfied, a transportation availability request that is to be used to schedule transportation of cargo between a first site and a second site,
wherein the transportation availability request includes:
site data that identifies geographic locations of the first site and the second site, and particular capacity data that specifies an amount of capacity needed to transport the cargo;
obtain, by interacting with a subset of the other systems associated with the set of partner carriers, capacity data that identifies amounts of available capacity within the vehicles;
convert the transportation availability request to one or more formats that are compatible with a set of booking systems associated with the set of partner carriers;
provide the converted transportation availability request to the set of booking systems;
receive price data from the set of booking systems,
the price data specifying rates for using the vehicles to transport the particular cargo between two or more of the sites;
generate a recommendation that specifies one or more recommended routes, of the set of routes, that particular vehicles, of the vehicles, are capable of traversing in order to assist in transporting the cargo between the first site and the second site,
wherein the recommendation is based on the global reference data, the cargo transportation data, the price data, contents of the transportation availability request, and the capacity data;
provide the recommendation to the first system;
receive, from the first system, a booking request that includes route selection data that identifies a selected route, of the one or more recommended routes, that one or more vehicles, of the particular vehicles, are to use to transport the cargo;
provide the booking request to one or more other systems associated with one or more partner carriers of the set of partner carriers;
receive one or more booking responses from the one or more other systems;
provide, to the first system, an indication of whether the one or more partner carriers have provided confirmation of assistance in transporting the cargo between the first site and the second site;
generate at least one transaction log that describes a set of interactions with the first system and the one or more other systems;
process the at least one transaction log to identify trends relating to prices that are commonly agreed upon or rejected by the carrier and a particular partner carrier of the set of partner carriers; and
recommend, based on the trends, price ranges in subsequent transactions to one or more of:
the carrier, or
the particular partner carrier.

16. The non-transitory computer-readable medium of claim 15, wherein a first format used to communicate with the first system associated with the carrier is different from one or more other formats used to communicate with other systems associated with the set of partner carriers.

17. The non-transitory computer-readable medium of claim 15, wherein the transportation availability request further includes a carrier identifier for the carrier;
wherein the one or more instructions, when executed by the one or more processors, further cause the one or more processors to:
identify the one or more types of partnerships between the carrier and the respective partner carriers by using the carrier identifier to reference the partnership data stored via the data structure;
identify a set of data sharing restrictions based on the one or more types of partnerships; and
wherein the one or more instructions, that cause the one or more processors to generate the recommendation, cause the one or more processors to:
generate the recommendation based on a subset of the cargo transportation data that excludes particular cargo transportation data that fails to comply with the set of data sharing restrictions.

18. The non-transitory computer-readable medium of claim 15, wherein the selected route includes a set of stops that include one or more intermediary sites and the second site;
wherein the one or more vehicles are a selected set of vehicles;
wherein a first subset of vehicles, of the selected set of vehicles, are assigned to transport the cargo to a first subset of the set of stops,
wherein the first subset of vehicles is controlled by a first partner carrier of the set of partner carriers; and
wherein a second subset of vehicles, of the selected set of vehicles, are assigned to transport the cargo to a second subset of the set of stops,
wherein the second subset of vehicles are controlled by a second partner carrier of the set of partner carriers.

19. The non-transitory computer-readable medium of claim 15, wherein the one or more instructions, that cause the one or more processors to generate the recommendation, cause the one or more processors to:
compare the amount of capacity needed to transport the cargo between the first site and the second site and particular amounts of available capacity on the vehicles,
determine that a set of vehicles, of the vehicles, have a sufficient amount of available capacity based on comparing the amount of capacity and the particular amounts of available capacity, and
perform a route optimization technique to process specific route data for a subset of routes, of the set of routes, that are assigned to the set of vehicles, to identify the one or more recommended routes, from the subset of routes, that are assigned to the particular vehicles of the set of vehicles.

20. The non-transitory computer-readable medium of claim 15, wherein the one or more instructions, that cause the one or more processors to generate the recommendation, cause the one or more processors to:
generate the recommendation based on the global reference data, the route data, the partnership data, the price data, the contents of the transportation availability request, and the capacity data.

\* \* \* \* \*